US008750482B2

(12) United States Patent
Chingon et al.

(10) Patent No.: US 8,750,482 B2
(45) Date of Patent: Jun. 10, 2014

(54) METHODS AND SYSTEMS FOR PREEMPTIVE REJECTION OF CALLS

(75) Inventors: Robert A. Chingon, Honolulu, HI (US); Shadman Zafar, Coppell, TX (US); Craig L. Reding, Midland Park, NJ (US); Christopher L. Helbling, Stamford, CT (US); John R. Reformato, East Meadow, NY (US)

(73) Assignees: Verizon Data Services LLC, Temple Terrace, FL (US); Telesector Resources Group, Inc., New York, NY (US)

( * ) Notice: Subject to any disclaimer, the term of this patent is extended or adjusted under 35 U.S.C. 154(b) by 1452 days.

(21) Appl. No.: 10/720,938

(22) Filed: Nov. 24, 2003

(65) Prior Publication Data

US 2005/0053206 A1 Mar. 10, 2005

Related U.S. Application Data

(63) Continuation-in-part of application No. 10/083,792, filed on Feb. 27, 2002, now Pat. No. 7,142,646.

(60) Provisional application No. 60/272,122, filed on Feb. 27, 2001, provisional application No. 60/272,167, filed on Feb. 27, 2001, provisional application No. 60/275,667, filed on Mar. 13, 2001, provisional application No. 60/275,719, filed on Mar. 13, 2001, provisional application No. 60/275,020, filed on Mar. 13, 2001, provisional application No. 60/275,031, filed on Mar. 13, 2001, provisional application No. 60/276,505, filed on Mar. 19, 2001, provisional application No. 60/428,704, filed on Nov. 25, 2002, provisional application No. 60/436,018, filed on Dec. 26, 2002.

(51) Int. Cl.
*H04M 3/42* (2006.01)
*H04M 1/64* (2006.01)
*H04M 1/56* (2006.01)
*H04M 15/06* (2006.01)

(52) U.S. Cl.
USPC ............. 379/210.02; 379/88.19; 379/142.04; 379/142.05; 379/142.08

(58) Field of Classification Search
USPC ............. 379/210.02, 207.13, 207.02, 114.05, 379/142.08, 142.04, 142.05, 88.19; 370/352
See application file for complete search history.

(56) References Cited

U.S. PATENT DOCUMENTS

| 4,013,839 A | 3/1977 | Bell |
| 4,540,850 A | 9/1985 | Herr et al. ................. 379/88.19 |

(Continued)

FOREIGN PATENT DOCUMENTS

| CA | 2240878 | 12/1998 |
| DE | 10110942 | 9/2002 |

(Continued)

OTHER PUBLICATIONS

"The Mobile Phone User Guide", http://www.mobileshop.org/usertech/wildfire.htm, printed Oct. 1, 2004.

(Continued)

*Primary Examiner* — Thjuan K Addy

(57) ABSTRACT

Methods and systems consistent with the present invention screen calls. A first server receives information pertaining to a call to a user from a calling party. The first server then determines whether a real-time call management function is enabled for the user and determines whether a calling party number associated with the calling party is valid when the realtime call management function is not enabled. A call screening function is performed when the calling party number is invalid. The first server provides a notification of the call to a device associated with the user when the real-time call management function is enabled. A second server initiates the call screening function when the user selects a call screening option included in the notification.

49 Claims, 9 Drawing Sheets

(56) References Cited

U.S. PATENT DOCUMENTS

| | | | |
|---|---|---|---|
| 4,600,814 | A | 7/1986 | Herr et al. |
| 4,734,931 | A | 3/1988 | Cunniff et al. |
| 4,924,496 | A | 5/1990 | Figa et al. |
| 5,014,303 | A | 5/1991 | Velius |
| 5,113,431 | A | 5/1992 | Horn |
| 5,168,515 | A | 12/1992 | Gechter et al. |
| 5,222,125 | A * | 6/1993 | Creswell et al. .......... 379/114.05 |
| 5,274,700 | A | 12/1993 | Gechter et al. |
| 5,327,486 | A | 7/1994 | Wolff et al. ................ 379/93.23 |
| 5,329,578 | A | 7/1994 | Brennan et al. |
| 5,428,663 | A | 6/1995 | Grimes et al. |
| 5,440,624 | A | 8/1995 | Schoof, II |
| 5,483,586 | A | 1/1996 | Sussman |
| 5,533,096 | A | 7/1996 | Bales |
| 5,535,265 | A | 7/1996 | Suwandhaputra |
| 5,546,449 | A | 8/1996 | Hogan et al. |
| 5,548,636 | A | 8/1996 | Bannister |
| 5,550,907 | A | 8/1996 | Carlsen |
| 5,583,564 | A | 12/1996 | Rao et al. |
| 5,586,173 | A | 12/1996 | Misholi et al. |
| 5,588,037 | A | 12/1996 | Fuller et al. |
| 5,608,788 | A | 3/1997 | Demlow et al. |
| 5,619,555 | A | 4/1997 | Fenton et al. |
| 5,621,787 | A | 4/1997 | McKoy et al. |
| 5,623,541 | A | 4/1997 | Boyle et al. |
| 5,631,904 | A | 5/1997 | Fitser et al. .................. 370/261 |
| 5,638,434 | A | 6/1997 | Gottlieb et al. |
| 5,649,105 | A | 7/1997 | Aldred et al. |
| 5,652,789 | A | 7/1997 | Miner et al. .................. 379/201 |
| 5,661,788 | A | 8/1997 | Chin |
| 5,668,863 | A | 9/1997 | Bieselin et al. |
| 5,673,080 | A | 9/1997 | Biggs et al. |
| 5,692,213 | A | 11/1997 | Goldberg et al. |
| 5,710,591 | A | 1/1998 | Bruno et al. |
| 5,712,903 | A | 1/1998 | Bartholomew et al. |
| 5,715,444 | A | 2/1998 | Danish et al. |
| 5,717,863 | A | 2/1998 | Adamson et al. |
| 5,719,925 | A | 2/1998 | Peoples |
| 5,724,412 | A | 3/1998 | Srinivasan |
| 5,742,095 | A | 4/1998 | Bryant et al. |
| 5,742,668 | A | 4/1998 | Pepe et al. |
| 5,742,905 | A | 4/1998 | Pepe et al. |
| 5,745,561 | A | 4/1998 | Baker et al. |
| 5,745,884 | A | 4/1998 | Carnegie et al. |
| 5,751,800 | A | 5/1998 | Ardon |
| 5,752,191 | A | 5/1998 | Fuller et al. |
| 5,764,901 | A | 6/1998 | Skarbo et al. |
| 5,805,670 | A | 9/1998 | Pons et al. |
| 5,841,837 | A | 11/1998 | Fuller et al. |
| 5,864,603 | A | 1/1999 | Haavisto et al. |
| 5,872,841 | A | 2/1999 | King et al. |
| 5,875,242 | A | 2/1999 | Glaser et al. .................. 379/207 |
| 5,875,437 | A | 2/1999 | Atkins |
| 5,892,900 | A | 4/1999 | Ginter et al. |
| 5,903,845 | A | 5/1999 | Buhrmann et al. ............ 455/461 |
| 5,907,324 | A | 5/1999 | Larson et al. |
| 5,907,547 | A | 5/1999 | Foladare et al. .............. 370/352 |
| 5,910,987 | A | 6/1999 | Ginter et al. |
| 5,916,302 | A | 6/1999 | Dunn et al. |
| 5,917,817 | A | 6/1999 | Dunn et al. |
| 5,917,912 | A | 6/1999 | Ginter et al. |
| 5,920,826 | A | 7/1999 | Metso et al. |
| 5,920,847 | A | 7/1999 | Kolling et al. |
| 5,926,535 | A | 7/1999 | Reynolds |
| 5,944,769 | A | 8/1999 | Musk et al. |
| 5,945,989 | A | 8/1999 | Freishtat et al. |
| 5,960,342 | A | 9/1999 | Liem et al. |
| 5,963,925 | A | 10/1999 | Kolling et al. |
| 5,982,870 | A | 11/1999 | Pershan et al. |
| 6,005,870 | A | 12/1999 | Leung et al. |
| 6,011,579 | A | 1/2000 | Newlin |
| 6,018,571 | A | 1/2000 | Langlois et al. |
| 6,018,737 | A | 1/2000 | Shah et al. |
| 6,021,428 | A | 2/2000 | Miloslavsky |
| 6,029,151 | A | 2/2000 | Nikander |
| 6,031,896 | A | 2/2000 | Gardell et al. |
| 6,041,103 | A | 3/2000 | La Porta et al. |
| 6,052,372 | A | 4/2000 | Gittins et al. |
| 6,058,163 | A | 5/2000 | Pattison et al. |
| 6,061,432 | A | 5/2000 | Wallace et al. |
| 6,078,658 | A | 6/2000 | Yunoki |
| 6,088,435 | A | 7/2000 | Barber et al. |
| 6,092,102 | A | 7/2000 | Wagner |
| 6,100,882 | A | 8/2000 | Sharman et al. |
| 6,122,348 | A | 9/2000 | French-St. George et al. |
| 6,134,318 | A | 10/2000 | O'Neil |
| 6,134,548 | A | 10/2000 | Gottsman et al. |
| 6,144,671 | A | 11/2000 | Perinpanathan et al. |
| 6,145,096 | A | 11/2000 | Bereiter et al. |
| 6,154,646 | A | 11/2000 | Tran et al. |
| 6,161,008 | A | 12/2000 | Lee et al. |
| 6,163,692 | A | 12/2000 | Chakrabarti et al. |
| 6,167,119 | A | 12/2000 | Bartholomew et al. |
| 6,188,756 | B1 | 2/2001 | Mashinsky |
| 6,189,026 | B1 | 2/2001 | Birrell et al. |
| 6,192,123 | B1 | 2/2001 | Grunsted et al. .............. 379/350 |
| 6,195,660 | B1 | 2/2001 | Polnerow et al. |
| 6,215,863 | B1 | 4/2001 | Bennett et al. |
| 6,219,413 | B1 | 4/2001 | Burg ........................ 379/215.01 |
| 6,226,374 | B1 | 5/2001 | Howell et al. .................. 379/207 |
| 6,240,449 | B1 | 5/2001 | Nadeau |
| 6,243,366 | B1 | 6/2001 | Bradley et al. |
| 6,260,050 | B1 | 7/2001 | Yost et al. |
| 6,275,575 | B1 | 8/2001 | Wu |
| 6,282,522 | B1 | 8/2001 | Davis et al. |
| 6,298,062 | B1 | 10/2001 | Gardell et al. |
| 6,298,129 | B1 | 10/2001 | Culver et al. |
| 6,301,338 | B1 | 10/2001 | Makela et al. |
| 6,301,609 | B1 | 10/2001 | Aravamudan et al. ........ 709/207 |
| 6,310,939 | B1 | 10/2001 | Varney |
| 6,310,947 | B1 | 10/2001 | Polcyn ..................... 379/211.01 |
| 6,324,269 | B1 | 11/2001 | Malik |
| 6,330,321 | B2 | 12/2001 | Detampel et al. |
| 6,333,973 | B1 | 12/2001 | Smith et al. |
| 6,349,299 | B1 | 2/2002 | Spencer et al. |
| 6,351,279 | B1 | 2/2002 | Sawyer |
| 6,363,143 | B1 | 3/2002 | Fox |
| 6,371,484 | B1 | 4/2002 | Yuan |
| 6,373,817 | B1 | 4/2002 | Kung et al. |
| 6,373,930 | B1 | 4/2002 | McConnell et al. |
| 6,385,754 | B1 | 5/2002 | Mizumoto et al. |
| 6,389,113 | B1 | 5/2002 | Silverman |
| 6,404,873 | B1 | 6/2002 | Beyda et al. |
| 6,408,191 | B1 | 6/2002 | Blanchard et al. |
| 6,408,327 | B1 | 6/2002 | McClennon et al. |
| 6,411,605 | B1 | 6/2002 | Vance et al. |
| 6,418,214 | B1 | 7/2002 | Smythe et al. |
| 6,430,176 | B1 | 8/2002 | Christie |
| 6,430,289 | B1 | 8/2002 | Liffick ........................ 379/900 |
| 6,434,226 | B1 | 8/2002 | Takahashi |
| 6,442,245 | B1 | 8/2002 | Castagna et al. |
| 6,442,251 | B1 | 8/2002 | Maes et al. |
| 6,442,748 | B1 | 8/2002 | Bowman-Amuah |
| 6,453,031 | B2 | 9/2002 | Malik |
| 6,453,167 | B1 | 9/2002 | Michaels et al. |
| 6,459,780 | B1 | 10/2002 | Wurster et al. ........... 379/142.02 |
| 6,459,913 | B2 | 10/2002 | Cloutier |
| 6,463,145 | B1 | 10/2002 | O'Neal et al. ........... 379/211.02 |
| 6,463,464 | B1 | 10/2002 | Lazaridis et al. |
| 6,466,910 | B1 | 10/2002 | Desmond et al. |
| 6,470,079 | B1 | 10/2002 | Benson |
| 6,473,615 | B1 | 10/2002 | Theppasandra et al. |
| 6,477,374 | B1 | 11/2002 | Shaffer et al. .................. 455/445 |
| 6,480,830 | B1 | 11/2002 | Ford et al. |
| 6,480,890 | B1 | 11/2002 | Lee, Jr. et al. |
| 6,507,644 | B1 | 1/2003 | Henderson et al. |
| 6,519,326 | B1 | 2/2003 | Milewski et al. |
| 6,522,734 | B1 | 2/2003 | Allen et al. |
| 6,526,134 | B1 | 2/2003 | Wallenius |
| 6,532,285 | B1 | 3/2003 | Tucker et al. |
| 6,535,596 | B1 | 3/2003 | Frey et al. |
| 6,539,082 | B1 | 3/2003 | Lowe et al. |
| 6,542,596 | B1 * | 4/2003 | Hill et al. ................. 379/207.02 |
| 6,546,005 | B1 | 4/2003 | Berkley et al. ................ 370/353 |

(56) References Cited

U.S. PATENT DOCUMENTS

| | | | |
|---|---|---|---|
| 6,546,262 B1 | 4/2003 | Freadman | |
| 6,547,830 B1 | 4/2003 | Mercer | |
| 6,560,329 B1 | 5/2003 | Draginich et al. | |
| 6,563,914 B2 | 5/2003 | Sammon et al. | |
| 6,564,261 B1 | 5/2003 | Gudjonsson et al. | 709/227 |
| 6,574,324 B1 | 6/2003 | Malik | |
| 6,574,470 B1 | 6/2003 | Chow et al. | |
| 6,577,622 B1 | 6/2003 | Schuster et al. | 370/352 |
| 6,577,720 B1 | 6/2003 | Sutter | |
| 6,584,122 B1 | 6/2003 | Matthews et al. | 370/493 |
| 6,587,890 B1 | 7/2003 | Kult et al. | |
| 6,590,603 B2 | 7/2003 | Sheldon et al. | |
| 6,590,969 B1 | 7/2003 | Peters et al. | |
| 6,594,352 B1 | 7/2003 | Smith | |
| 6,594,470 B1 | 7/2003 | Barnes et al. | |
| 6,600,736 B1 | 7/2003 | Ball et al. | |
| 6,609,113 B1 | 8/2003 | O'Leary et al. | |
| 6,611,590 B1 | 8/2003 | Lu et al. | |
| 6,614,786 B1 | 9/2003 | Byers | 370/353 |
| 6,618,710 B1 | 9/2003 | Zondervan et al. | |
| 6,625,258 B1 | 9/2003 | Ram et al. | |
| 6,628,194 B1 | 9/2003 | Hellebust et al. | |
| 6,628,770 B1 | 9/2003 | Jain et al. | |
| 6,631,186 B1 | 10/2003 | Adams et al. | |
| 6,636,587 B1 | 10/2003 | Nagai et al. | |
| 6,643,356 B1 | 11/2003 | Hickey et al. | |
| 6,654,768 B2 | 11/2003 | Celik | |
| 6,661,340 B1 | 12/2003 | Saylor et al. | |
| 6,665,388 B2 | 12/2003 | Bedingfield | |
| 6,668,046 B1 | 12/2003 | Albal | |
| 6,668,049 B1 | 12/2003 | Koch et al. | |
| 6,681,119 B1 | 1/2004 | Verdonk | |
| 6,683,939 B1 | 1/2004 | Chiloyan et al. | |
| 6,687,362 B1 | 2/2004 | Lindquist et al. | |
| 6,690,672 B1 | 2/2004 | Klein | |
| 6,693,897 B1 * | 2/2004 | Huang | 370/352 |
| 6,694,351 B1 | 2/2004 | Shaffer et al. | |
| 6,697,461 B1 | 2/2004 | Middleswarth et al. | |
| 6,697,796 B2 | 2/2004 | Kermani | |
| 6,704,294 B1 | 3/2004 | Cruickshank | |
| 6,711,158 B1 | 3/2004 | Kahane et al. | |
| 6,717,938 B1 | 4/2004 | D'Angelo | |
| 6,718,026 B1 | 4/2004 | Pershan et al. | |
| 6,718,178 B1 | 4/2004 | Miner et al. | |
| 6,724,887 B1 | 4/2004 | Eilbacher et al. | |
| 6,731,238 B2 | 5/2004 | Johnson | |
| 6,735,292 B1 | 5/2004 | Johnson | |
| 6,738,458 B1 | 5/2004 | Cline et al. | |
| 6,744,861 B1 | 6/2004 | Pershan et al. | |
| 6,747,970 B1 | 6/2004 | Lamb et al. | |
| 6,748,054 B1 | 6/2004 | Gross et al. | |
| 6,754,227 B1 | 6/2004 | Petersen et al. | |
| 6,757,365 B1 | 6/2004 | Bogard | |
| 6,768,788 B1 | 7/2004 | Langseth et al. | |
| 6,768,790 B1 | 7/2004 | Manduley et al. | |
| 6,771,949 B1 | 8/2004 | Corliss | |
| 6,772,436 B1 | 8/2004 | Doganata et al. | |
| 6,775,267 B1 | 8/2004 | Kung et al. | |
| 6,775,546 B1 | 8/2004 | Fuller | |
| 6,788,772 B2 | 9/2004 | Barak et al. | |
| 6,788,775 B1 * | 9/2004 | Simpson | 379/207.13 |
| 6,792,092 B1 | 9/2004 | Michalewicz | |
| 6,798,753 B1 | 9/2004 | Doganata et al. | |
| 6,801,610 B1 | 10/2004 | Malik | |
| 6,807,258 B1 | 10/2004 | Malik | |
| 6,807,259 B1 | 10/2004 | Patel et al. | |
| 6,816,468 B1 | 11/2004 | Cruickshank | |
| 6,816,469 B1 | 11/2004 | Kung et al. | |
| 6,820,055 B2 | 11/2004 | Saindon et al. | |
| 6,839,417 B2 | 1/2005 | Weisman et al. | |
| 6,842,460 B1 | 1/2005 | Olkkonen et al. | |
| 6,847,823 B2 | 1/2005 | Lehikoinen et al. | |
| 6,853,634 B1 | 2/2005 | Davies et al. | |
| 6,853,713 B1 | 2/2005 | Fobert et al. | |
| 6,856,974 B1 | 2/2005 | Ganesan et al. | |
| 6,870,916 B2 | 3/2005 | Henrikson et al. | |
| 6,876,632 B1 | 4/2005 | Takeda | |
| 6,876,736 B2 | 4/2005 | Lamy et al. | |
| 6,882,714 B2 | 4/2005 | Mansfield | |
| 6,882,838 B1 | 4/2005 | Lee et al. | |
| 6,885,742 B1 | 4/2005 | Smith | |
| 6,907,111 B1 | 6/2005 | Zhang et al. | |
| 6,917,610 B1 | 7/2005 | Kung et al. | |
| 6,937,713 B1 | 8/2005 | Kung et al. | |
| 6,944,279 B2 | 9/2005 | Elsey et al. | |
| 6,947,538 B2 | 9/2005 | Shen et al. | |
| 6,954,521 B2 | 10/2005 | Bull et al. | |
| 6,954,524 B2 | 10/2005 | Gibson | |
| 6,956,942 B2 | 10/2005 | McKinzie et al. | |
| 6,958,984 B2 | 10/2005 | Kotzin | |
| 6,961,409 B2 | 11/2005 | Kato | |
| 6,963,857 B1 | 11/2005 | Johnson | |
| 6,970,705 B2 | 11/2005 | Yoshimoto et al. | |
| 6,988,132 B2 | 1/2006 | Horvitz | |
| 6,996,227 B2 | 2/2006 | Albal et al. | |
| 6,996,370 B2 | 2/2006 | DeLoye et al. | |
| 6,999,563 B1 | 2/2006 | Thorpe et al. | |
| 7,024,209 B1 | 4/2006 | Gress et al. | |
| 7,027,435 B2 | 4/2006 | Bardehle | |
| 7,031,437 B1 | 4/2006 | Parsons et al. | |
| 7,043,521 B2 | 5/2006 | Eitel | |
| 7,065,198 B2 | 6/2006 | Brown et al. | |
| 7,068,768 B2 | 6/2006 | Barnes | |
| 7,069,298 B2 | 6/2006 | Zhu et al. | |
| 7,076,528 B2 | 7/2006 | Premutico | |
| 7,099,288 B1 | 8/2006 | Parker et al. | |
| 7,102,643 B2 | 9/2006 | Moore et al. | |
| 7,107,312 B2 | 9/2006 | Hackbarth et al. | |
| 7,116,972 B1 | 10/2006 | Zhang et al. | |
| 7,127,050 B2 | 10/2006 | Walsh et al. | |
| 7,130,390 B2 | 10/2006 | Abburi | |
| 7,139,728 B2 | 11/2006 | Rigole | |
| 7,139,782 B2 | 11/2006 | Osaki | |
| 7,142,646 B2 | 11/2006 | Zafar et al. | |
| 7,149,773 B2 | 12/2006 | Haller et al. | |
| 7,155,001 B2 | 12/2006 | Tiliks et al. | |
| 7,167,552 B1 | 1/2007 | Shaffer et al. | |
| 7,174,306 B1 | 2/2007 | Haseltine | |
| 7,181,417 B1 | 2/2007 | Langseth et al. | |
| 7,187,932 B1 | 3/2007 | Barchi | |
| 7,190,773 B1 | 3/2007 | D'Silva et al. | |
| 7,209,955 B1 | 4/2007 | Major et al. | |
| 7,212,808 B2 | 5/2007 | Engstrom et al. | |
| 7,245,929 B2 | 7/2007 | Henderson et al. | |
| 7,254,220 B1 | 8/2007 | Reding et al. | |
| 7,254,643 B1 | 8/2007 | Peters et al. | |
| 7,283,808 B2 | 10/2007 | Castell et al. | |
| 7,289,489 B1 | 10/2007 | Kung et al. | |
| 7,308,087 B2 | 12/2007 | Joyce et al. | |
| 7,315,614 B2 | 1/2008 | Bedingfield et al. | |
| 7,353,258 B2 | 4/2008 | Washburn | |
| 7,379,538 B1 | 5/2008 | Ali et al. | |
| 7,418,090 B2 | 8/2008 | Reding et al. | |
| 7,420,935 B2 | 9/2008 | Virolainen | |
| 7,428,580 B2 | 9/2008 | Hullfish et al. | |
| 7,546,337 B1 | 6/2009 | Crawford | |
| 7,561,872 B1 | 7/2009 | Koch et al. | |
| 7,606,909 B1 | 10/2009 | Ely et al. | |
| 7,616,747 B2 | 11/2009 | Wurster et al. | |
| 7,912,193 B2 | 3/2011 | Chingon et al. | |
| 8,166,173 B2 | 4/2012 | Low et al. | |
| 8,238,380 B2 | 8/2012 | D'Angelo | |
| 8,271,591 B2 | 9/2012 | Malik et al. | |
| 8,467,502 B2 | 6/2013 | Sureka et al. | |
| 2001/0003202 A1 | 6/2001 | Mache et al. | |
| 2001/0012286 A1 | 8/2001 | Huna et al. | |
| 2001/0014863 A1 | 8/2001 | Williams, III | |
| 2001/0017777 A1 | 8/2001 | Maruyama et al. | |
| 2001/0025262 A1 | 9/2001 | Ahmed | |
| 2001/0025280 A1 | 9/2001 | Mandato et al. | |
| 2001/0032181 A1 | 10/2001 | Jakstadt et al. | |
| 2001/0039191 A1 | 11/2001 | Maierhofer | |
| 2001/0040954 A1 | 11/2001 | Brachman et al. | |
| 2001/0043689 A1 | 11/2001 | Malik | |

(56) References Cited

U.S. PATENT DOCUMENTS

| | | |
|---|---|---|
| 2001/0043690 A1 | 11/2001 | Bakshi et al. |
| 2001/0043691 A1 | 11/2001 | Bull et al. |
| 2001/0051534 A1 | 12/2001 | Amin |
| 2001/0051919 A1 | 12/2001 | Mason |
| 2001/0054066 A1 | 12/2001 | Spitzer |
| 2001/0056466 A1 | 12/2001 | Thompson et al. |
| 2002/0012425 A1 | 1/2002 | Brisebois et al. |
| 2002/0018550 A1 | 2/2002 | Hafez |
| 2002/0022453 A1 | 2/2002 | Balog et al. |
| 2002/0026575 A1 | 2/2002 | Wheeler et al. |
| 2002/0035617 A1 | 3/2002 | Lynch et al. |
| 2002/0040355 A1 | 4/2002 | Weiner |
| 2002/0046299 A1 | 4/2002 | Lefeber et al. |
| 2002/0055351 A1 | 5/2002 | Elsey et al. |
| 2002/0057678 A1 | 5/2002 | Jiang et al. |
| 2002/0062251 A1 | 5/2002 | Anandan et al. |
| 2002/0064268 A1 | 5/2002 | Pelletier |
| 2002/0069060 A1 | 6/2002 | Cannavo et al. |
| 2002/0069096 A1 | 6/2002 | Lindoerfer et al. |
| 2002/0071539 A1 | 6/2002 | Diament et al. |
| 2002/0073163 A1 | 6/2002 | Churchill et al. |
| 2002/0075303 A1 | 6/2002 | Thompson et al. |
| 2002/0075306 A1 | 6/2002 | Thompson et al. |
| 2002/0076022 A1 | 6/2002 | Bedingfield |
| 2002/0076025 A1 | 6/2002 | Liversidge et al. |
| 2002/0076026 A1 | 6/2002 | Batten |
| 2002/0076027 A1 | 6/2002 | Bernnan et al. |
| 2002/0077082 A1 | 6/2002 | Cruickshank |
| 2002/0078153 A1 | 6/2002 | Chung et al. |
| 2002/0080942 A1 | 6/2002 | Clapper ............... 379/201.01 |
| 2002/0082028 A1 | 6/2002 | Wittenkamp |
| 2002/0082030 A1 | 6/2002 | Berndt et al. |
| 2002/0082997 A1 | 6/2002 | Kobata et al. |
| 2002/0083462 A1 | 6/2002 | Arnott ..................... 348/14.08 |
| 2002/0085515 A1 | 7/2002 | Jaynes et al. |
| 2002/0085687 A1 | 7/2002 | Contractor et al. |
| 2002/0085701 A1 | 7/2002 | Parsons et al. |
| 2002/0087469 A1 | 7/2002 | Ganesan et al. |
| 2002/0100798 A1 | 8/2002 | Farrugia et al. |
| 2002/0103864 A1 | 8/2002 | Rodman et al. |
| 2002/0103898 A1 | 8/2002 | Moyer et al. |
| 2002/0110121 A1 | 8/2002 | Mishra ..................... 370/389 |
| 2002/0115471 A1 | 8/2002 | DeLoye et al. |
| 2002/0122545 A1 | 9/2002 | Schwab |
| 2002/0126817 A1 | 9/2002 | Hariri et al. |
| 2002/0128025 A1 | 9/2002 | Sin |
| 2002/0128033 A1 | 9/2002 | Burgess |
| 2002/0137507 A1 | 9/2002 | Winkler |
| 2002/0137530 A1 | 9/2002 | Karve |
| 2002/0138468 A1 | 9/2002 | Kermani |
| 2002/0146105 A1 | 10/2002 | McIntyre |
| 2002/0147777 A1 | 10/2002 | Hackbarth et al. |
| 2002/0147811 A1 | 10/2002 | Schwartz et al. ............. 709/225 |
| 2002/0152165 A1 | 10/2002 | Dutta et al. |
| 2002/0154210 A1 | 10/2002 | Ludwig et al. |
| 2002/0168055 A1 | 11/2002 | Crockett et al. |
| 2002/0177410 A1 | 11/2002 | Klein et al. |
| 2002/0178117 A1 | 11/2002 | Maguire et al. |
| 2003/0005150 A1 | 1/2003 | Thompson |
| 2003/0014488 A1 | 1/2003 | Dalal et al. |
| 2003/0035381 A1 | 2/2003 | Chen et al. |
| 2003/0036380 A1 | 2/2003 | Skidmore |
| 2003/0045309 A1 | 3/2003 | Knotts |
| 2003/0046071 A1 | 3/2003 | Wyman |
| 2003/0053612 A1 | 3/2003 | Henrikson et al. |
| 2003/0055735 A1 | 3/2003 | Cameron et al. |
| 2003/0055906 A1 | 3/2003 | Packham et al. |
| 2003/0058838 A1 | 3/2003 | Wengrovitz ................ 370/352 |
| 2003/0063732 A1 | 4/2003 | Mcknight |
| 2003/0069874 A1 | 4/2003 | Hertzog et al. |
| 2003/0083040 A1 | 5/2003 | Ruth et al. |
| 2003/0092451 A1 | 5/2003 | Holloway et al. |
| 2003/0093700 A1 | 5/2003 | Yoshimoto et al. |
| 2003/0096626 A1 | 5/2003 | Sabo et al. |
| 2003/0097635 A1 | 5/2003 | Giannetti |
| 2003/0104827 A1 | 6/2003 | Moran et al. |
| 2003/0108172 A1* | 6/2003 | Petty et al. ............... 379/142.08 |
| 2003/0112928 A1 | 6/2003 | Brown et al. |
| 2003/0112952 A1 | 6/2003 | Brown et al. |
| 2003/0119532 A1 | 6/2003 | Hatch |
| 2003/0140004 A1 | 7/2003 | O'Leary et al. |
| 2003/0142798 A1 | 7/2003 | Gavette et al. |
| 2003/0147518 A1 | 8/2003 | Albal et al. |
| 2003/0149662 A1 | 8/2003 | Shore |
| 2003/0158860 A1 | 8/2003 | Caughey |
| 2003/0165223 A1 | 9/2003 | Timmins et al. |
| 2003/0167229 A1 | 9/2003 | Ludwig et al. |
| 2003/0169330 A1 | 9/2003 | Ben-Shachar et al. |
| 2003/0179743 A1 | 9/2003 | Bosik et al. |
| 2003/0179864 A1 | 9/2003 | Stillman et al. |
| 2003/0187992 A1 | 10/2003 | Steenfeldt et al. |
| 2003/0208541 A1 | 11/2003 | Musa |
| 2003/0217097 A1 | 11/2003 | Eitel |
| 2003/0228863 A1 | 12/2003 | Vander Veen et al. |
| 2004/0002350 A1 | 1/2004 | Gopinath et al. |
| 2004/0002902 A1 | 1/2004 | Muehlhaeuser |
| 2004/0019638 A1 | 1/2004 | Makagon et al. ............. 709/204 |
| 2004/0034700 A1 | 2/2004 | Polcyn |
| 2004/0037409 A1 | 2/2004 | Crockett et al. |
| 2004/0044658 A1 | 3/2004 | Crabtree et al. |
| 2004/0052356 A1 | 3/2004 | McKinzie et al. |
| 2004/0081292 A1 | 4/2004 | Brown et al. |
| 2004/0103152 A1 | 5/2004 | Ludwig et al. |
| 2004/0119814 A1 | 6/2004 | Clisham et al. |
| 2004/0127256 A1 | 7/2004 | Goldthwaite et al. |
| 2004/0156491 A1 | 8/2004 | Reding et al. |
| 2004/0184593 A1 | 9/2004 | Elsey et al. |
| 2004/0203942 A1 | 10/2004 | Dehlin |
| 2004/0208305 A1 | 10/2004 | Gross et al. |
| 2004/0236792 A1 | 11/2004 | Celik |
| 2004/0247088 A1 | 12/2004 | Lee |
| 2004/0249884 A1 | 12/2004 | Caspi et al. |
| 2004/0264654 A1 | 12/2004 | Reding et al. |
| 2005/0053206 A1 | 3/2005 | Chingon et al. |
| 2005/0053221 A1 | 3/2005 | Reding et al. |
| 2005/0102382 A1 | 5/2005 | MacGregor et al. |
| 2005/0117714 A1 | 6/2005 | Chingon et al. |
| 2005/0129208 A1 | 6/2005 | McGrath et al. |
| 2005/0149487 A1 | 7/2005 | Celik |
| 2005/0191994 A1 | 9/2005 | May et al. |
| 2005/0216421 A1 | 9/2005 | Barry et al. |
| 2005/0220286 A1 | 10/2005 | Valdez et al. |
| 2005/0243993 A1 | 11/2005 | McKinzie et al. |
| 2006/0093120 A1 | 5/2006 | Thorpe et al. |
| 2006/0095575 A1 | 5/2006 | Sureka et al. |
| 2006/0168140 A1 | 7/2006 | Inoue et al. |
| 2006/0276179 A1 | 12/2006 | Ghaffari et al. |
| 2006/0277213 A1 | 12/2006 | Robertson et al. |
| 2007/0021111 A1 | 1/2007 | Celik |
| 2009/0060155 A1 | 3/2009 | Chingon et al. |

FOREIGN PATENT DOCUMENTS

| | | |
|---|---|---|
| DE | 10255489 A1 | 9/2004 |
| EP | 0818908 | 1/1998 |
| EP | 0818908 A3 | 1/1998 |
| EP | 1014630 | 6/2000 |
| EP | 1017210 | 6/2000 |
| EP | 1028578 | 8/2000 |
| EP | 1161063 | 12/2001 |
| EP | 1193617 | 4/2002 |
| EP | 1235387 | 8/2002 |
| EP | 1294201 | 3/2003 |
| JP | 59-169264 | 9/1984 |
| JP | 02-260750 | 10/1990 |
| JP | 04-336742 | 11/1992 |
| JP | 05-316233 | 11/1993 |
| JP | 6-113020 | 4/1994 |
| JP | 07-030664 | 1/1995 |
| JP | 07-058856 | 3/1995 |
| JP | 07-107171 | 4/1995 |
| JP | 07-107549 | 4/1995 |
| JP | 07-123098 | 5/1995 |
| JP | 08-149226 | 6/1996 |

(56) References Cited

FOREIGN PATENT DOCUMENTS

| | | |
|---|---|---|
| JP | 08-181763 | 7/1996 |
| JP | 08-298546 | 11/1996 |
| JP | 8-331642 | 12/1996 |
| JP | 09-064977 | 3/1997 |
| JP | 09-083651 | 3/1997 |
| JP | 9064869 (A) | 3/1997 |
| JP | 09-200350 | 7/1997 |
| JP | 09-223087 | 8/1997 |
| JP | 9-261759 | 10/1997 |
| JP | 09-294158 | 11/1997 |
| JP | 09-294163 | 11/1997 |
| JP | 10-013546 | 1/1998 |
| JP | 10-051555 | 2/1998 |
| JP | 10-155038 | 6/1998 |
| JP | 10-173769 | 6/1998 |
| JP | 10-336319 | 12/1998 |
| JP | 11-055407 | 2/1999 |
| JP | 11-127222 | 5/1999 |
| JP | 11-136316 | 5/1999 |
| JP | 11-187156 | 7/1999 |
| JP | 11-191800 | 7/1999 |
| JP | 11-266509 | 9/1999 |
| JP | 2000-032116 | 1/2000 |
| JP | 2000134309 | 5/2000 |
| JP | 2000-165433 | 6/2000 |
| JP | 2000-196756 | 7/2000 |
| JP | 2000-224301 | 8/2000 |
| JP | 2000-270307 | 9/2000 |
| JP | 2000-349902 | 12/2000 |
| JP | 2001-144859 | 5/2001 |
| JP | 2001-156921 | 6/2001 |
| JP | 2001-197210 | 7/2001 |
| JP | 2001-197562 | 7/2001 |
| JP | 2001-243231 | 9/2001 |
| JP | 2001-298545 | 10/2001 |
| JP | 2002016673 | 1/2002 |
| JP | 2002-41522 | 2/2002 |
| JP | 2002-044123 | 2/2002 |
| JP | 2002-044257 | 2/2002 |
| JP | 2002-057807 | 2/2002 |
| JP | 2002-094696 | 3/2002 |
| JP | 2002-232575 | 8/2002 |
| JP | 2002-237893 | 8/2002 |
| JP | 2002-247148 | 8/2002 |
| JP | 2002-261834 | 9/2002 |
| JP | 2002-300306 | 10/2002 |
| JP | 2002300290 | 10/2002 |
| WO | WO-95/12948 | 5/1995 |
| WO | 96/14704 | 5/1996 |
| WO | WO-97/20423 | 6/1997 |
| WO | WO-97/33421 | 9/1997 |
| WO | WO-98/02007 | 6/1998 |
| WO | WO-99/22493 | 5/1999 |
| WO | 99/38309 | 7/1999 |
| WO | 00/45557 | 8/2000 |
| WO | 00/64133 | 10/2000 |
| WO | WO-00/60837 | 10/2000 |
| WO | WO01/11586 | 2/2001 |
| WO | WO 01/11586 A1 | 2/2001 |
| WO | WO-01/22751 | 3/2001 |
| WO | WO 01/35621 | 5/2001 |
| WO | 01/52513 | 7/2001 |
| WO | WO 01/89212 | 11/2001 |
| WO | WO-02/25907 | 3/2002 |
| WO | WO-02/43338 | 5/2002 |

OTHER PUBLICATIONS

Komowski, J., "Wildfire at Your Back and Call-A Voice-Activated Telephone Assistant That Minds You and Your Messages", http://www.lacba.org/lalawyer/techwildfire.html, pronted Oct. 1, 2004.
Cisco Personal Assistant 1.4, Cisco Systems, Jun. 24, 2003, http://www.cisco.com/en/US/products/sw/voicesw/ps2026/prod_presentation_list.html, printed Oct. 1, 2004.
"MP3 Recorder Download—MP3 Recorder—Record Audio Stream to MP3 or WAV," 2002, http://www.mp3-recorder.net.
"FAQ Premium Home Answer" eVoice, http://content.evoice.com/wcs/signUp/FAQ_premHA_s01.htm.
"Audio Digitizing Process," TalkBank, http://www.talkbank.org/da/audiodig.html.
"Supplemental Report to Diary 53, Networking the Sound Digitizing Device," Old Colorado City Communications and the National Science Foundation Wireless Field Tests, Oct. 20, 2002, Lansing, Michigan, http://wireless.oldcolo.com/biology/ProgressReports2002/Progress%2OReports2002/53SupplementalReport(10-20-02).htm.
"Macromedia SoundEdit 16 Support Center-Working with Other Programs, What is Shockwave Audio Streaming?" http://www.macromedia.com/support/soundedit/how/shock/whatis.html.
"How Internet Radio Works," Howstuffworks, http://computerhowstuffworks.com/internet-radio.htm/printable.
"Real-Time Collaboration Integration in the Portal," T. Odenwald, SAP Design Guild, http://www.sapdesignguild.org/editions/edition5/synch_collab.asp.
"NetMeeting101," http://www.meetingbywire.com/NetMeeting101.htm.
"NetMeeting102," http://www.meetingbywire.com/NetMeeting102.htm.
"Instructions on Application Sharing and Data Collaboration," Vcon Escort and Cruiser, http://www.vide.gatech.edu/docs/share/.
"Instructions on Multipoint Application Sharing and Data Collaboration," VCON Escort and Cruiser with the RadVision MCU, http://www.vide.gatech.edu/docs/multi-share/.
"MediaTone—The 'Dial Tone' for Web Communications Services," Webex, 2003.
Business Solutions/Professional, http://www.accessline.com/business_sol/bs_professional_body.html.
"Accessline Comms' Accessline Service, the One-Number Wonder," *CommWeb* T. Kramer, Feb. 1, 2000, http://www.cconvergence.com/article/TCM20000504S0014.
"InteleScreener," 2003, http://www.intelescreener.com/howitworks.html.
"TeleZapper from Privacy Technologies," Privacy Corps—Our Review, 2002, http://www.privacycorps.com/pages/product1.htm.
Data Connection, Strategic Computer Technology, MeetingServer, "Broadband for Learning Case Study," Data Connection Ltd, 1998-2004, http://www.dataconnection.com/conferencing/meetingserver_casestudy.htm.
Data Connection, MaiINGen, "Next Generation Messaging for Service Providers," Data Connection Limited, 2003-4.
Data Connection, Strategic Computer Technology, "Directories Explained," Data Connection Ltd, 1998-2004, http://www.dataconnection.com/inetapps/direxpl.htm.
Data Connection, Strategic Computer Technology, Directory Systems, "Directories and Meta-Directories," Data Connection Ltd, 1998-2004, http://www.dataconnection.com/inetapps/directory.htm.
Data Connection, Strategic Computer Technology, "DC-IMS\Voice Unified Messaging Gateway," Data Connection Ltd, 1998-2000, http://web.archive.org/web/20010307174512/www.dataconnection.com/messging/spivoice.htm.
Data Connection, Strategic Software Technology, "DC-SurroundSuite for Service Providers," Data Connection Ltd, 1998-2000, http://web.archive.org/web/20000914200355/www.dataconnection.com/messging/spssuite.htm.
Data Connection, Strategic Computer Technology, "Messaging Software Products and Services," Data Connection Ltd, 1998-2000, http://web.archive.org/web/2000819063320/www.dataconnection.com/messaging/messgidx.htm.
Data Connection, Strategic Software Technology, "DC-Share for UNIX," Data Connection Ltd, 1998-2000, http://web.archive.org/web/20000914200713/www.dataconnection.com/conf/DCshare.htm.
Data Connection, Strategic Software Technology, "DC-H.323," Data Connection Ltd, 1998-2000, http://web.archive.org/web/20001120050600/www.dataconnection.com/conf/h323.htm.
Data Connection, Strategic Software Technology, "DC-WebShare," Data Connection Ltd, 1998-2000, http://web.archive.org/web/20001016115016/www.dataconnection.com/conf/webshare.htm.

(56) References Cited

OTHER PUBLICATIONS

Data Connection, Strategic Computer Technology, "DC-Recorder," Data Connection Ltd, 1998-2000, http://web.archive.org/web/20001016055611/www.dataconnection.com/conf/recorder.htm.

Data Connection, Strategic Software Technology, "DC-MeetingServer," Data Connection Ltd, 1998-2000, http://web.archive.org/web/20000914200719/www.dataconnection.com/conf/meeting server.htm.

Data Connection, Strategic Computer Technology, "DC-MeetingServer," Data Connection Ltd, 1998-2000, http://web.archive.org/web/20021201144529/www.dataconnection.com/inetapps.conferencing.htm.

Data Connection, Strategic Software Technology, "DC-VoiceNet Features," Data Connection Ltd, 1998-2000, http://web.archive.org/web/20001016102614/www.dataconnection.com/messging/vnfeat.htm.

Data Connection, Strategic Software Technology, "DC-VoiceNet," Data Connection Ltd, 1998-2000, http://web.archive.org/web/20000914200424/www.dataconnection.com/messging/vnet.htm.

Data Connection, Strategic Computer Technology, "Messaging Software Products and Services," Data Connection Ltd, 1998-2000, http://web.archive.org/web/20010305143803/www.dataconnection.com/messging/messgidx.htm.

Data Connection, Strategic Computer Technology, "DC-SurroundSuite for Enterprises," Data Connection Ltd, 1998-2000, http://web.archive.org/web/20010306082711/www.dataconnection.com/messging/enssuite.htm.

Data Connection, "SIP Market Overview, An analysis of SIP technology and the state of the SIP Market," Jonathan Cumming, Data Connection Ltd., 2003-2004.

Data Connection, "Integrating Voicemail Systems, A white paper describing the integration of heterogeneous voicemail systems," Michael James, Internet Applications Group, Data Connection Ltd., 2004.

Data Connection, Strategic Computer Technology, "MailNGen: Next generation messaging for Service Providers," Data Connection Ltd, 1998-2004, http://www.dataconnection.com/messaging/.

Data Connection, Strategic Computer Technology, "MaiiNGen: Unified Messaging," Data Connection Ltd, 1998-2004, http://www.dataconnection.com/messaging/unified_messaging.htm.

Data Connection, Strategic Computer Technology, "MeetingServer: The award-winning web conferencing solution for Service Providers," Data Connection Ltd, 1998-2005, http://www.dataconnection.com/conferencing/.

Data Connection, Strategic Computer Technology, "MeetingServer: The web conferencing solution for Service Providers," Data Connection Ltd, 1998-2004, http://www.dataconnection.com/conferencing/meetingserver.htm.

Data Connection, Strategic Computer Technology, "MeetingServer: Web conferencing architecture," Data Connection Ltd, 1998-2004, http://www.dataconnection.com/conferencing/meetingserver_arch.htm.

U.S. Appl. No.09/828,679, filed Apr. 6, 2002, Reding et al.

"MP3 Recorder Download—MP3 Recorder—Record Audio Stream to MP3 or WAV," 2002 http://www.mp3-recorder.net "FAQ Premium Home Answer" eVoice, http://content.evoice.com/wcs/signUp/FAQ_premHA_s01.htm.

"How Internet Radio Works," Howstuffworks, http://computer.howstuffworks.com/internet-radio.htm/printable.

"Real-Time Collaboration Integration in the Portal," T. Odenwald, SAP Design Guild, http://www.sapdesignguild.org/editions/edition5/synch_collab.asp.

"MP3 Recorder Download—MP3 Recorder—Record Audio Stream to MP3 or WAV," 2002, http://www.mp3-recorder.net, Submitted on Nov. 24, 2003.

"FAQ Premium Home Answer" eVoice, http://content.evoice.com/wcs/signUp/FAQ_premHA_s01.htm, Submitted on Nov. 24, 2003.

"Voice-ASP, White Paper Technology & Processes," eVoice, Dec. 13, 2000.

"Voice-ASP, White Paper: Market Opportunities for Enhanced Voicemail," eVoice, Nov. 10, 2000.

"Audio Digitizing Process," TalkBank, http://www.talkbank.org/da/audiodig.html, Submitted on Nov. 24, 2003.

"Supplemental Report to Diary 53, Networking the Sound Digitizing Device," Old Colorado City Communications and the National Science Foundation Wireless Field Tests, Oct. 20, 2002, Lansing, Michigan, http://wireless.oldcolo.com/biology/ProgressReports2002/Progress%20Reports2002/53SupplementalReport(10-20-02).htm.

"Macromedia SoundEdit 16 Support Center-Working with Other Programs, What is Shockwave Audio Streaming?" http://www.macromedia.com/support/soundedit/how/shock/whatis.html, Submitted on Nov. 24, 2003.

"Chapter 3: Overview," last updated Dec. 2, 1999, http://service.real.com/help/library/guides/g270/htmfiles/overview.htm.

"How Internet Radio Works," Howstuffworks, http://computer.howstuffworks.com/internet-radio.htm/printable, Submitted on Nov. 24, 2003.

"Telecommunications and Personal Management Services Linked in Collaboration by Verizon and Microsoft," Oct. 23, 2001, http://www.microsoft.com/presspass/press/2001/oct01/10-23MSVerizonPr.asp.

"Real-Time Collaboration Integration in the Portal," T. Odenwald, SAP Design Guild, http://www.sapdesignguild.org/editions/edition5/synch_collab.asp, Submitted on Nov. 24, 2003.

"NetMeeting101," http://www.meetingbywire.com/NetMeeting101.htm, Submitted on Nov. 24, 2003.

"NetMeeting102," http://www.meetingbywire.com/NetMeeting102.htm, Submitted on Nov. 24, 2003.

"Instructions on Application Sharing and Data Collaboration," VCON Escort and Cruiser, http://www.vide.gatech.edu/docs/share/, Submitted on Nov. 24, 2003.

"Instructions on Multipoint Application Sharing and Data Collaboration," VCON Escort and Cruiser with the RadVision MCU, http://www.vide.gatech.edu/docs/multi-share/, Submitted on Nov. 24, 2003.

"File Transfer," Microsoft Windows Technologies Windows NetMeeting, last updated Jun. 4, 1999, http://www.microsoft.com/windows/netmeeting/features/files/default.asp.

"From Dial Tone to Media Tone," Analyst: R. Mahowald, IDC, Jun. 2002.

"MediaTone—The 'Dial Tone' for Web Communications Services," Webex, 2003, Submitted on Nov. 24, 2003.

Business Solutions/Professional, http://www.accessline.com/business_sol/bs_professional_body.html, Submitted on Nov. 24, 2003.

"Accessline Comms' Accessline Service, the One-Number Wonder," *CommWeb*, T. Kramer, Feb. 1, 2000, http://www.cconvergence.com/article/TCM20000504S0014.

"InteleScreener," 2003, http://www.intelescreener.com/howitworks.html, Submitted on Nov. 24, 2003.

"TeleZapper from Privacy Technologies," Privacy Corps—Our Review, 2002, http://www.privacycorps.com/pages/product1.htm, Submitted on Nov. 24, 2002.

"A Proposal for Internet Call Waiting Service Using SIP," A. Brusilovsky et al., Lucent Technologies, PINT Working Group, Internet Draft, Jan. 1999.

"A Model for Presence and Instant Messaging," M. Day et al., Fujitsu, Feb. 2000, Network Working Group, Request for Comments 2778.

Data Connection, Strategic Computer Technology, MeetingServer, "Broadband for Learning Case Study," Data Connection Ltd, 1998-2004, http://www.dataconnection.com/conferencing/meetingserver_casestudy.htm, Submitted on Nov. 24, 2003.

Data Connection, MailNGen, "Next Generation Messaging for Service Providers," Data Connection Limited, 2003-4, Submitted on Nov. 24, 2003.

Data Connection, Strategic Computer Technology, "Directories Explained," Data Connection Ltd, 1998-2004, http://www.dataconnection.com/inetapps/direxpl.htm, Submitted on Nov. 24, 2003.

Data Connection, Strategic Computer Technology, Directory Systems, "Directories and Meta-Directories," Data Connection Ltd, 1998-2004, http://www.dataconnection.com/inetapps/directory.htm, Submitted on Nov. 24, 2003.

Data Connection, Strategic Computer Technology, "DC-IMS\Voice Unified Messaging Gateway," Data Connection Ltd, 1998-2000,

(56) References Cited

OTHER PUBLICATIONS http://web.archive.orq/web/20010307174512/www.dataconnection.com/messging/spivoice.htm, Submitted on Nov. 24, 2003.

Data Connection, Strategic Software Technology, "DC-SurroundSuite for Service Providers," Data Connection Ltd, 1998-2000, http://web.archive.org/web/20000914200355/www.dataconnection.com/messging/spssuite.htm, Submitted on Nov. 24, 2003.

Data Connection, Strategic Computer Technology, "Messaging Software Products and Services," Data Connection Ltd, 1998-2000, http://web.archive.orq/web/20000819063320/www.dataconnection.com/messging/messgidx.htm, Submitted on Nov. 24, 2003.

Data Connection, Strategic Software Technology, "DC-Share for UNIX," Data Connection Ltd, 1998-2000, http://web.archive.org/web/20000914200713/www.dataconnection.com/conf/DCshare.htm, Submitted on Nov. 24, 2003.

Data Connection. Strategic Software Technology "DC-H.323," Data Connection Ltd, 1998-2000, http://web.archive.org/web/20001120050600/www.dataconnection.com/conf/h323.htm, Submitted on Nov. 24, 2003.

Data Connection, Strategic Software Technology, "DC-WebShare," Data Connection Ltd, 1998-2000, http://web.archive.org/web/20001016115016/www.dataconnection.com/conf/webshare.htm, Submitted on Nov. 24, 2003.

Data Connection, Strategic Computer Technology, "DC-Recorder," Data Connection Ltd, 1998-2000, http://web.archive.org/web/20001016055611/www.dataconnection.com/conf/recorder.htm, Submitted on Nov. 24, 2003.

Data Connection, Strategic Computer Technology, "DC-MeetingServer," Data Connection Ltd, 1998-2000, http://web.archive.orq/web/20000914200719/www.dataconnection.com/conf/meetingserver.htm, Submitted on Nov. 24, 2003.

Data Connection, Strategic Computer Technology, "DC-MeetingServer," Data Connection Ltd, 1998-2000, http://web.archive.org/web/20021201144529/www.dataconnection.com/inetapps/conferencing.htm, Submitted on Nov. 24, 2003.

Data Connection, Strategic Software Technology, "DC-VoiceNet Features," Data Connection Ltd, 1998-2000, http://web.archive.org/web/20001016102614/www.dataconnection.com/messging/vnfeat.htm, Submitted on Nov. 24, 2003.

Data Connection, Strategic Software Technology, "DC-VoiceNet," Data Connection Ltd, 1998-2000, http://web.archive.org/web/20000914200424/www.dataconnection.com/messging/vnet.htm, Submitted on Nov. 24, 2003.

Data Connection, Strategic Computer Technology, "Messaging Software Products and Services," Data Connection Ltd, 1998-2000, http://web.archive.org/web/20010305143803/www.dataconnection.com/messging/messgidx.htm, Submitted on Nov. 24, 2003.

Data Connection, Strategic Computer Technology, "DC-SurroundSuite for Enterprises," Data Connection Ltd, 1998-2000, http://web.archive.org/web/20010306082711/www.dataconnection.com/messging/enssuite.htm, Submitted on Nov. 24, 2003.

Data Connection, "SmartDialer Functional Overview," Version v1.0, Internet Applications Group, Data Connection Ltd., Nov. 3, 2003.

Data Connection, "SIP Market Overview, An analysis of SIP technology and the state of the SIP Market," Jonathan Cumming, Data Connection Ltd., 2003-2004, Submitted on Nov. 24, 2003.

Data Connection, "Integrating Voicemail Systems, A white paper describing the integration of heterogeneous voicemail systems," Michael James, Internet Applications Group, Data Connection Ltd., 2004, Submitted on Nov. 24, 2003.

Data Connection, Strategic Computer Technology, "MailNGen: Next generation messaging for Service Providers," Data Connection Ltd, 1998-2004, http://www.dataconnection.com/messaging/, Submitted on Nov. 24, 2003.

Data Connection, Strategic Computer Technology, "MailNGen: Unified Messaging," Data Connection Ltd, 1998-2004, http://www.dataconnection.com/messaging.unified_messaging.htm, Submitted on Nov. 3, 2004.

Data Connection, Strategic Computer Technology, "MeetingServer: The award-winning web conferencing solution for Service Providers," Data Connection Ltd, 1998-2005, http://www.dataconnection.com/conferencing/, Submitted on Nov. 24, 2003.

Data Connection, Strategic Computer Technology, "MeetingServer: The web conferencing solution for Service Providers," Data Connection Ltd, 1998-2004, http://www.dataconnection.com/conferencing/meetingserver.htm, Submitted on Nov. 24, 2003.

Data Connection, Strategic Computer Technology, "MeetingServer: Web conferencing architecture," Data Connection Ltd, 1998-2004, http://www.dataconnection.com/conferencing/meetingserver_arch.htm, Submitted on Nov. 24, 2003.

"MP3 Recorder Download—MP3 Recorder—Record Audio Stream to MP3 or WAV," 2002 http://www.mp3-recorder.net, Submitted on Nov. 24, 2003.

U.S. Appl. No. 09/828,679, filed Apr. 6, 2001, Reding et al.

U.S. Appl. No. 09/785,223, filed Feb. 16, 2001, Swingle et al.

Business Solutions/Professional, http://www.accessline.com/business_sol/bs_professional_body.html, Submitted Nov. 24, 2003.

"InteleScreener," 2003, http://www.intelescreener.com/howitworks.html, Submitted on Nov. 24, 2003.

"TeleZapper from Privacy Technologies," Privacy Corps—Our Review, 2002, http://www.privacycorps.com/pages/product1.htm, Submitted on Nov. 24, 2003.

"A Model for Presence and Instant Messaging", M. Day, et al. Fujitsu, Feb. 2000, Network Working Group, Request for Comments 2778.

White, "How Computers Work", Millennium Edition, 1999, Que Corporation, Indianapolis, IN, all pages.

Derfler, "How Networks Work," Bestseller Edition, 1996, Ziff-Davis Press, Emeryville, CA, all pages.

Gralla, "How the Internet Works," Millennium Edition, 1999, Que Corporation, Indianapolis, IN, all pages.

Muller, "Desktop Encyclopedia of the Internet," 1999, Artech House Inc., Norwood, MA, all pages.

"Calendar Scheduling Teleconference Communication Mechanism," IBM Technical Disclosure Bulletin, IBM Corp. New York, US, vol. 37, No. 3, Mar. 1, 1994, p. 561.

White, "How Computers Work," Millenium Edition, Sep. 1999, Que Corporation, pp. vi-xi, 135-184, 399-421.

Derfler et al., "How Networks Work," Bestseller Edition, 1996, Ziff-Davis Press, pp. vi-ix, 1-3, 21-70, 190-198.

Gralla, "How the Internet Works," Ziff-Davis Press, 1999, pp. vi-xi, 2-3, 8-11, 308-324.

Muller, "Desktop Encyclopedia of the Internet," Artech House Inc., 1999, pp. v-xiv, 233-246, 539-559.

http://replay.waybackmachine.org/20020207142936/hhttp://clicktocall.com/main.htm, Internet archive of website "www.clicktocall.com", dated Feb. 7, 2002.

Gaedke, et al., "Web Content Delivery to Heterogeneous Mobile Platforms", http://citeseer.ist.psu.edu/viewdoc/summary?doi=10.1.1.33.4361, 1998, 1-14.

Gessler, et al., "PDAs as mobile WWW browers", http://citeseer.ist.psu.edu/viewdoc/summary?doi=1 0.1.1.48.9198, 1995, 1-12.

Kunz, et al., "An Architecture for Adaptive Mobile Applications", http://citeseer.ist.psu.edu/viewdoc/summary?doi=1 0.1.1.40.624, 1999, 1-15.

Lauff, et al., "Multimedia Client Implementation on Personal Digital Assistants", http://citeseer.ist.psu.edu/viewdoc/summary?doi=10.1.1.6.6059, 1997, 1-15.

Oct. 27, 2011, Canadian Office Action Issued in CA s/n 2,507,093.

Chou, "Inside SSL: The Secure Sockets Layer Protocol," IT Professional, vol. 4, Issue 4, pp. 47-52, Jul./Aug. 2002.

Wagner, et al., "Analysis of the SSL 3.0 Protocol," Proceedings of the 2nd Conference on Proceedings of the Second USENIX Workshop on Electronic Commerce (WOEC'96) vol. 2, 12 pages, Nov. 1996.

* cited by examiner

METHODS AND SYSTEMS FOR PREEMPTIVE REJECTION OF CALLS

RELATED APPLICATIONS

This application is a continuation-in-part of U.S. patent application Ser. No. 10/083,792, entitled "VOICE MAIL INTEGRATION WITH INSTANT MESSENGER," filed Feb. 27, 2002 now U.S. Pat. No. 7,142,646; U.S. patent application Ser. No. 10/083,884, entitled "DEVICE INDEPENDENT CALLER ID," filed Feb. 27, 2002; and U.S. patent application Ser. No. 10/083,822, entitled "METHOD AND APPARATUS FOR A UNIFIED COMMUNICATION MANAGEMENT VIA INSTANT MESSAGING," filed Feb. 27, 2002, all of which claim priority to U.S. Provisional Patent Application Nos. 60/272,122, 60/272,167, filed Feb. 27, 2001, 60/275,667, 60/275,719, 60/275,020, 60/275,031 all provisional filed on Mar. 13, 2001, and 60/276,505 filed Mar. 19, 2001, and all of which are expressly incorporated herein by reference in their entirety.

Applicants also claim the right to priority under 35 U.S.C. § 119(e) based on Provisional Patent Application No. 60/428,704, entitled "DIGITAL COMPANION," filed Nov. 25, 2002; and Provisional Patent Application No. 60/436,018, entitled "DIGITAL COMPANION," filed Dec. 26, 2002, both of which are expressly incorporated herein by reference in their entirety.

The present application also relates to U.S. patent application Ser. No. 10/083,793, entitled "METHODS AND APPARATUS FOR CALENDARED COMMUNICATIONS FLOW CONTROL," filed Feb. 27, 2002; U.S. patent application Ser. No. 10/084,121, entitled "CALENDAR-BASED CALLING AGENTS," filed Feb. 27, 2002; U.S. patent application Ser. No. 10/720,661, entitled "METHODS AND SYSTEMS FOR CONFIGURING AND PROVIDING CONFERENCE CALLS"; U.S. patent application Ser. No. 10/720,859, entitled "METHODS AND SYSTEMS FOR CONFERENCE CALL BUFFERING"; U.S. patent application Ser. No. 10/721,009, entitled "METHODS AND SYSTEMS FOR COMPUTER ENHANCED CONFERENCE CALLING"; U.S. patent application Ser. No. 10/720,943, entitled "METHODS AND SYSTEMS FOR REMOTE CALL ESTABLISHMENT"; U.S. patent application Ser. No. 10/721,005, entitled "METHODS AND SYSTEMS FOR CALL MANAGEMENT WITH USER INTERVENTION"; U.S. patent application Ser. No. 10/720,868, entitled "METHODS AND SYSTEMS FOR DIRECTORY INFORMATION LOOKUP"; U.S. patent application Ser. No. 10/720,970, entitled "METHODS AND SYSTEMS FOR AUTOMATIC COMMUNICATION LINE MANAGEMENT BASED ON DEVICE LOCATION"; U.S. patent application Ser. No. 10/720,952, entitled "METHODS AND SYSTEMS FOR ADAPTIVE MESSAGE AND CALL NOTIFICATION"; U.S. patent application Ser. No. 10/720,870, entitled "METHODS AND SYSTEMS FOR A CALL LOG"; U.S. patent application Ser. No. 10/720,633, entitled "METHODS AND SYSTEMS FOR AUTOMATIC FORWARDING OF CALLS TO A PREFERRED DEVICE"; U.S. patent application Ser. No. 10/720,971, entitled "METHODS AND SYSTEMS FOR LINE MANAGEMENT"; U.S. patent application Ser. No. 10/720,784, entitled "METHODS AND SYSTEMS FOR CONTACT MANAGEMENT"; U.S. patent application Ser. No. 10/720,920, entitled "METHODS AND SYSTEMS FOR NOTIFICATION OF CALL TO PHONE DEVICE"; U.S. patent application Ser. No. 10/720,825, entitled "METHODS AND SYSTEMS FOR SINGLE NUMBER TEXT MESSAGING"; U.S. patent application Ser. No. 10/720,944, entitled "METHODS AND SYSTEMS FOR MULTI-USER SELECTIVE NOTIFICATION,"; U.S. patent application Ser. No. 10/720,933, entitled "METHODS AND SYSTEMS FOR CPN TRIGGERED COLLABORATION"; and U.S. patent application Ser. No. 10/720,938, entitled "METHODS AND SYSTEMS FOR PREEMPTIVE REJECTION OF CALLS", all of which are expressly incorporated herein by reference in their entirety.

TECHNICAL FIELD

The present invention relates generally to data processing systems and, more particularly, to a method and system for preemptively rejecting phone calls.

BACKGROUND

A wide variety of means exist for communication between users. For example, a user may conduct phone calls via a home phone, work phone, and mobile phone. In addition, users may also communicate using devices such as PC's, PDA's, pagers, etc. using manners of communicating such as email and instant messaging.

Unfortunately, managing such a wide variety of communication means can be difficult. In particular, as a user changes location, communication with the user may vary. For example, while on travel, it may only be possible to reach a user by mobile phone. However, the user may best be reached by email while at work. Also, the user may wish to implement various rules for receiving and controlling communications. For example, to be reached at home, the user may want the home phone to ring three times before forwarding the call to a mobile phone. As another example, the user may wish to be paged each time an email is received from a particular person while away from the office.

A user may also wish to treat a phone call differently dependent on who is calling the user. For example, if a user receives a call from a caller that the user does not want to speak to at the moment, the user may want to send that call directly to voice mail. Also, if a user receives a call from a number that displays no caller ID information or that the user otherwise does not recognize, the user may wish to somehow specially treat the call because the caller is a potential telemarketer.

Current call screening systems may recognize that the caller ID of a calling part is blocked or unavailable and allow the called party to make a decision on how to dispose of the call while the calling party is still on the line.

Current call screening systems, however, do not enable a user to make such a decision when the user is away from the specific device belonging to the called telephone number. Moreover, current call screening systems do not enable a user to manually initiate call screening in real-time.

SUMMARY OF THE INVENTION

Methods and systems consistent with the principles of the invention screen calls. A first server receives information pertaining to a call to a user from a calling party. The first server then determines whether a real-time call management function is enabled for the user and determines whether a calling party number associated with the calling party is valid when the real-time call management function is not enabled. A call screening function is performed when the calling party number is invalid. The first server provides a notification of the call to a device associated with the user when the real-time call management function is enabled. A second server initiates the call screening function when the user selects a call screening option included in the notification.

Other methods and systems consistent with the principles of the invention also screen calls. A first server receives information pertaining to a call to a user from a calling party and retrieves data corresponding to the user using the information pertaining to the call. The first server then determines whether a real-time call management function is enabled for the user and determines whether a calling party number associated with the calling party is valid when the real-time call management function is not enabled. A call screening function is performed when the calling party number is invalid. The first server also selects a device associated with the user to receive a notification of the call based on the retrieved data and provides the notification of the call to the selected device when the real-time call management function is enabled. A second server initiates the call screening function when the user selects a call screening option included in the notification.

Another method and system consistent with the principles of the invention screens a call. A device associated with a user receives notification of a call to the user. The notification includes a user-selectable call screening option and is received based on a determination that a real-time call management function is enabled for the user, wherein when the real-time call management function is not enabled for the user, a call screening function is performed if a calling party number associated with the calling party is invalid. The device also receives input from the user indicative of selection of the call screening option. Thereafter, the device sends, to a server, information reflective of the selection of the call screening option, wherein the server initiates the call screening function responsive to the selection of the call screening option.

BRIEF DESCRIPTION OF THE DRAWINGS

The accompanying drawings, which are incorporated in and constitute a part of this specification, illustrate one embodiment of the invention and, together with the description, serve to explain the principles of the invention.

DETAILED DESCRIPTION

Reference will now be made in detail to exemplary embodiments of the present invention, examples of which are illustrated in the accompanying drawings. Wherever possible, the same reference numbers will be used throughout the drawings to refer to the same or like parts. While the description includes exemplary embodiments, other embodiments are possible, and changes may be made to the embodiments described without departing from the spirit and scope of the invention. The following detailed description does not limit the invention. Instead, the scope of the invention is defined by the appended claims and their equivalents.

Overview

Methods and systems consistent with the present invention screen a call. A service center receives information pertaining to a call to a user from a calling party and retrieves data corresponding to the user using the information pertaining to the call. The service center also determines whether a real-time call management function is enabled for the user. If the real-time call management function is not enabled, then the service center determines whether a calling party number associated with the calling party is valid. A call screening function is performed when the calling party number is invalid. Moreover, the service center selects a device associated with the user to receive a notification of the call based on the retrieved data corresponding to the user. Thereafter, the service center provides the notification of the call to the selected device based on a determination that the real-time call management function is enabled, and initiates the call screening function when the user selects a call screening option included in the notification.

Network Environment

Figure 1:
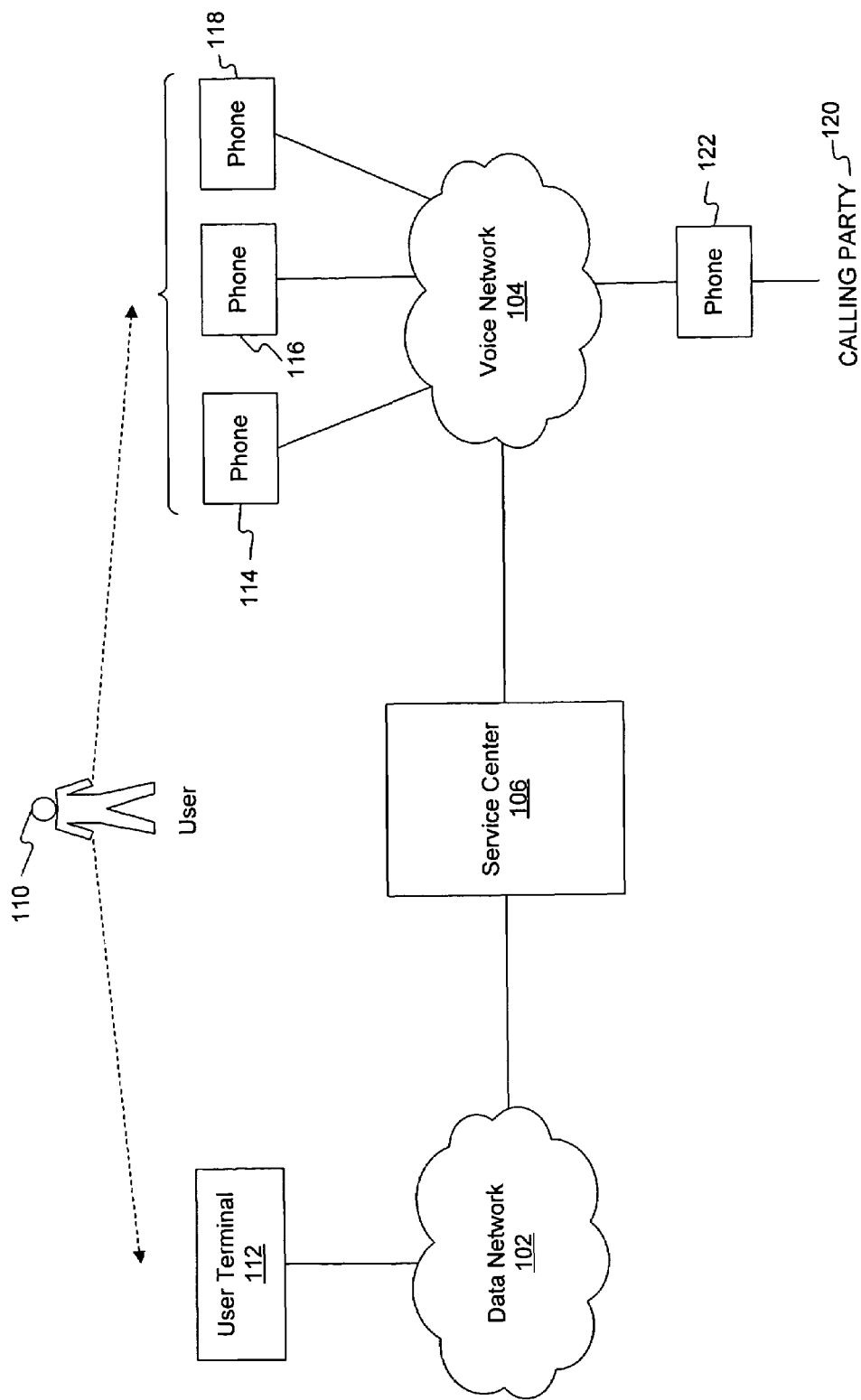
FIG. 1 is a diagram of an exemplary data processing and telecommunications environment in which features and aspects consistent with the principals of the present invention may be implemented.

FIG. 1 is a block diagram of a data processing and telecommunications environment 100, in which features and aspects consistent with the present invention may be implemented. The number of components in environment 100 is not limited to what is shown and other variations in the number of arrangements of components are possible, consistent with embodiments of the invention. The components of FIG. 1 may be implemented through hardware, software, and/or firmware. Data processing and telecommunications environment 100 may include a data network 102, a voice network 104, and a service center 106. A user 110 may use a user terminal 112 to interface with data network 102 and may use phones 114, 116, and 118 to interface with voice network 104. A calling party 120 may use phone 122 to call a user, such as user 110, at any one of phones 114, 116, and 118.

Data network 102 provides communications between the various entities depicted in environment 100 of FIG. 1, such as user terminal 112 and service center 106. Data network 102 may be a shared, public, or private network and encompass a wide area or local area. Data network 102 may be implemented through any suitable combination of wired and/or wireless communication networks. By way of example, data network 102 may be implemented through a wide area network (WAN), local area network (LAN), an intranet and/or the Internet. Further, service center 106 may be connected to multiple data networks 102, such as, for example, to a wireless carrier network and to the Internet.

Voice network 104 may provide telephony services to allow a calling party, such as calling party 120, to place a telephone call to user 110. In one embodiment, voice network 104 may be implemented using a network, such as the Public Switched Telephone Network ("PSTN"). Alternatively, voice network 104 may be implemented on a voice over broadband network, such as a network using voice-over Internet Protocol ("VoIP") technology. Additionally, in other embodiments, voice network 104 may be a video over broadband network, such as, for example, a network for providing 2-way video communications. In another example, voice network 104 may be a wireless broadband network, such as, for example, a network using WiFi (i.e., IEEE 802.11(b) and/or (g)). In yet another example, voice network 104 may be a wireless voice network(s), such as, for example, a cellular or third-generation cellular network). In addition, voice network 104 may be implemented using any single or combination of the above-described technologies consistent with the principles of the present invention. Further, service center 106 may be connected to multiple voice networks 104, such as for example, Verizon's™ Voice Network, voice networks operated by other carriers, and wireless carrier networks.

Service center 106 provides a platform for managing communications over data network 102 and voice network 104. Service center 106 also provides gateway functions, such as code and protocol conversions, to transfer communications between data network 102 and voice network 104. Service center 106 may be implemented using a combination of hardware, software, and/or firmware. For example, service center 106 may be implemented using a plurality of general purpose computers or servers coupled by a network (not shown). Although service center 106 is shown with direct connections to data network 102 and voice network 104, any number and type of network elements may be interposed between service center 106, data network 102, and voice network 104.

User terminal 112 provides user 110 an interface to data network 102. For example, user terminal 112 may be implemented using any device capable of accessing the Internet, such as a general purpose computer or personal computer equipped with a modem. User terminal 112 may also be implemented in other devices, such as the Blackberry™, and Ergo Audrey™. Furthermore, user terminal 112 may be implemented in wireless devices, such as pagers, mobile phones (with data access functions), and Personal Digital Assistants ("PDA") with network connections.

User terminal 112 also allows user 110 to communicate with service center 106. For example, user 110 may use instant messaging ("IM") to communicate with service center 106. In addition, user terminal 112 may use other aspects of TCP/IP including the hypertext transfer protocol ("HTTP"); the user datagram protocol ("UDP"); the file transfer protocol ("FTP"); the hypertext markup language ("HTML"); and the extensible markup language ("XML").

Furthermore, user terminal 112 may communicate directly with service center 106. For example, a client application may be installed on user terminal 112, which directly communicates with service center 106. Also, user terminal 112 may communicate with service center 106 via a proxy.

Phones 114, 116, 118, and 122 interface with voice network 104. Phones 114, 116, 118, and 122 may be implemented using known devices, including wireline phones and mobile phones. Although phones 114, 116, 118, and 122 are shown directly connected to voice network 104, any number of intervening elements, such as a private branch exchange ("PBX"), may be interposed between phones 114, 116, 118, and 122 and voice network 104.

Figure 2:
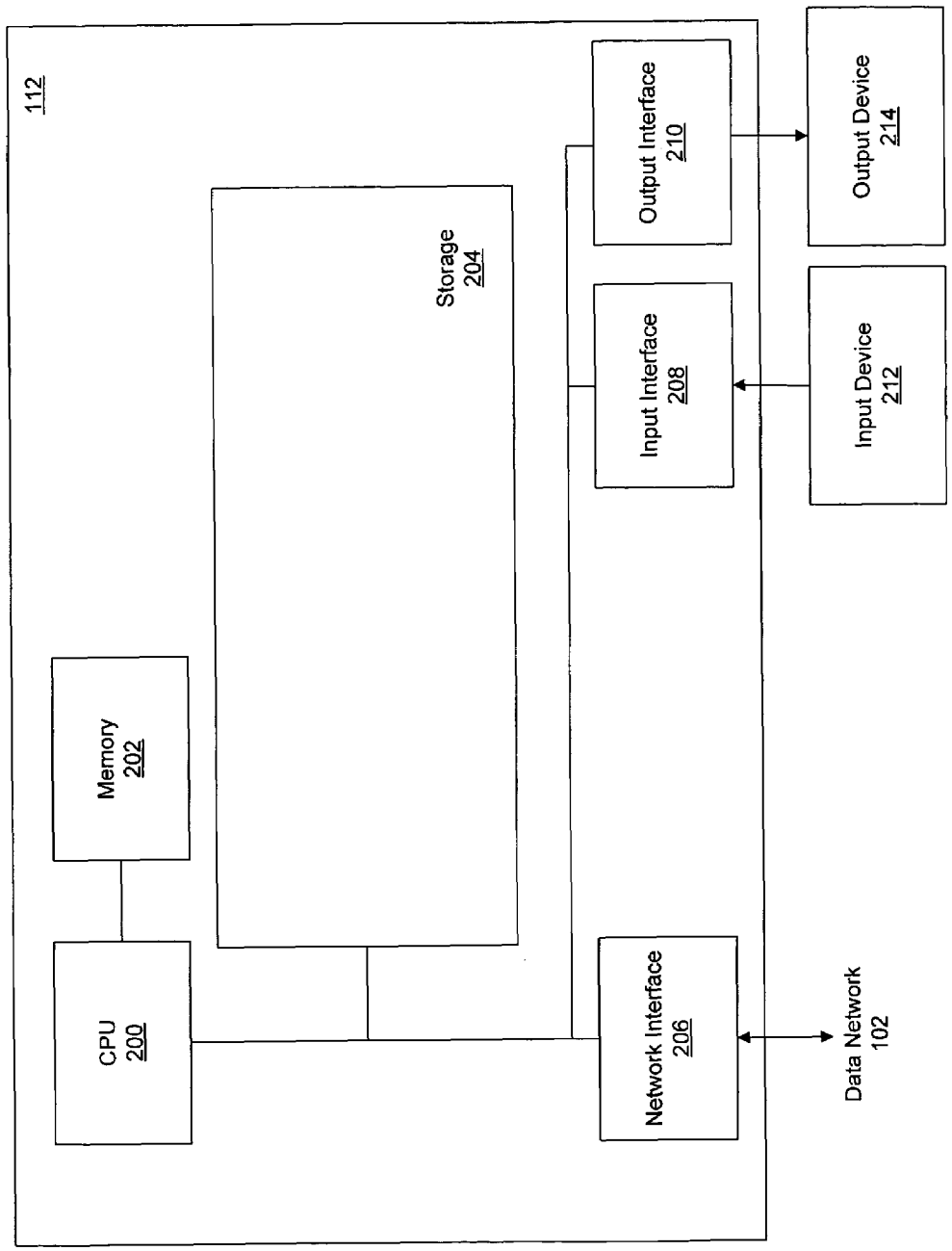
FIG. 2 is a diagram of an exemplary user terminal, consistent with the principals of the present invention.

FIG. 2 is a block diagram of a user terminal consistent with the present invention. User terminal 112 may include a central processing unit (CPU) 200, a memory 202, a storage module 204, a network interface 206, an input interface 208, an output interface 210, an input device 216, and an output device 218.

CPU 200 provides control and processing functions for user terminal 112. Although FIG. 2 illustrates a single CPU, user terminal 112 may include multiple CPUs. CPU 200 may also include, for example, one or more of the following: a co-processor, memory, registers, and other processing devices and systems as appropriate. CPU 200 may be implemented, for example, using a Pentium™ processor provided from Intel Corporation.

Memory 202 provides a primary memory for CPU 200, such as for program code. Memory 202 may be embodied with a variety of components of subsystems, including a random access memory ("RAM") and a read-only memory ("ROM"). When user terminal 112 executes an application installed in storage module 204, CPU 200 may download at least a portion of the program code from storage module 204 into memory 202. As CPU 200 executes the program code, CPU 200 may also retrieve additional portions of program code from storage module 204.

Storage module 204 may provide mass storage for user terminal 112. Storage module 204 may be implemented with a variety of components or subsystems including, for example, a hard drive, an optical drive, CD ROM drive, DVD drive, a general-purpose storage device, a removable storage device, and/or other devices capable of storing information. Further, although storage module 204 is shown within user terminal 112, storage module 204 may be implemented external to user terminal 112.

Storage module 204 includes program code and information for user terminal 112 to communicate with service center 106. Storage module 204 may include, for example, program code for a calendar application, such as GroupWise provided by Novell Corporation or Outlook provided by Microsoft Corporation; a client application, such as a Microsoft Network Messenger Service (MSNMS) client or America Online Instant Messenger (AIM) client; and an Operating System (OS), such as the Windows Operation System provided by Microsoft Corporation. In addition, storage module 204 may include other program code and information, such as program code for TCP/IP communications; kernel and device drivers; configuration information, such as a Dynamic Host Configuration Protocol (DHCP) configuration; a web browser, such as Internet Explorer provided by Microsoft Corporation, or Netscape Communicator provided by Netscape Corporation; and any other software that may be installed on user terminal 112.

Network interface 206 provides a communications interface between user terminal 112 and data network 102. Network interface 206 may receive and transmit communications for user terminal 112. For example, network interface 206 may be a modem, or a local area network ("LAN") port.

Input interface 208 receives input from user 110 via input device 212 and provides the input to CPU 200. Input device 212 may include, for example, a keyboard, a microphone, and a mouse. Other types of input devices may also be implemented consistent with the principles of the present invention.

Output interface 210 provides information to user 110 via output device 214. Output device 214 may include, for example, a display, a printer, and a speaker. Other types of output devices may also be implemented consistent with the principles of the present invention.

Figure 3:
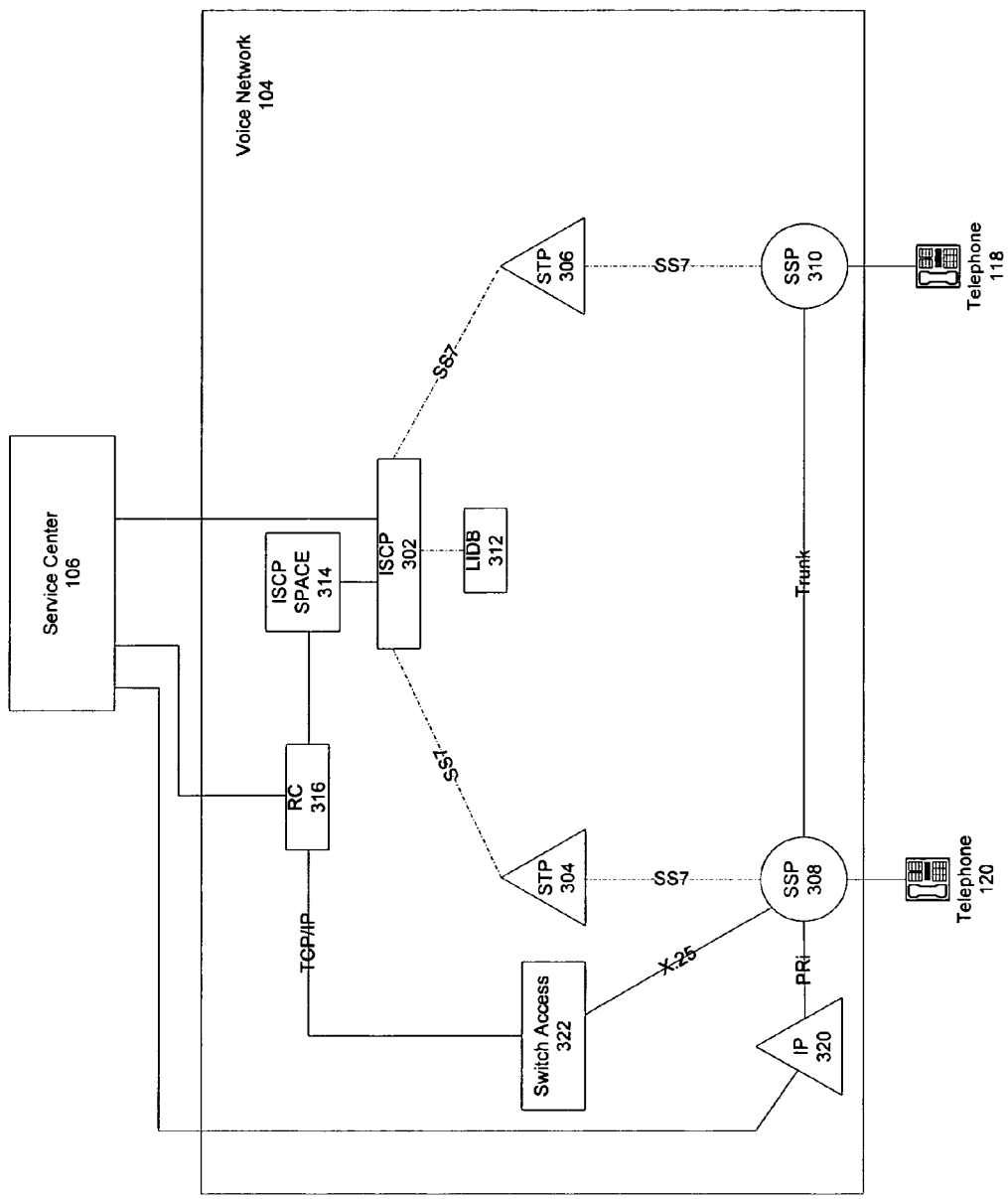
FIG. 3 is a diagram of a voice network, consistent with the principles of the present invention.

FIG. 3 is a diagram of a voice network, consistent with the principles of the present invention. As shown, voice network 104 includes an intelligent service control point (ISCP) 302, service transfer points (STP) 304 and 306, service switching points (SSP) 308 and 310, a line information database (LIDB) 312, an ISCP Service Provisioning And Creation Environment (SPACE) 314, a Recent Change Environment 316, an Intelligent Peripheral (IP) 320, and a switch access 322. Although this embodiment of a voice network 104 is described as a PSTN, as discussed above in other embodiments, the voice network 104 may be, for example, a voice or video over broadband network a wireless broadband, a wireless voice network, etc.

Voice network 104 may be implemented using the PSTN and SS7 as a signaling protocol. The SS7 protocol allows voice network 104 to provide features, such as call forwarding, caller-ID, three-way calling, wireless services such as roaming and mobile subscriber authentication, local number portability, and toll-free/toll services. The SS7 protocol provides various types of messages to support the features of voice network 104. For example, these SS7 messages may include Transaction Capabilities Applications Part ("TCAP") messages to support event "triggers," and queries and responses between ISCP 302 and SSPs 308 and 310.

ISCP 302 may also be, for example, a standard service control point (SCP), an Advanced Intelligent Network (AIN) SCP, a soft switch, or any other network call controller. ISCP 302 provides translation and routing services of SS7 messages to support the features of voice network 104, such as call forwarding. In addition, ISCP 302 may exchange information with the service center 106 using TCP/IP or SS7. ISCP 302 may include service logic used to provide a switch, such as SSP 308 or 310, with specific call processing instructions. ISCP 302 may also store data related to various features that a user may activate. Such features may include, for example, call intercept and voice mail. ISCP 302 may be implemented using a combination of known hardware and software. ISCP 302 is shown with a direct connection to service center 106 and a connection to ISCP SPACE 314, however, any number of network elements including routers, switches, hubs, etc., may be used to connect ISCP 302, ISCP SPACE 314, and service center 106. Further, information exchanged between the ISCP 302 and service center 106 may use, for example, the SR-3389 General Data Interface (GDI) for TCP/IP.

STPs 304 and 306 relay SS7 messages within voice network 104. For example, STP 304 may route SS7 messages between SSPs 308 and 310. STP 304 or 306 may be implemented using known hardware and software from manufacturers such as NORTEL™ and LUCENT Technologies™.

SSPs 308 and 310 provide an interface between voice network 104 and phones 114 and 120, respectively, to setup, manage, and release telephone calls within voice network 104. SSPs 308 and 310 may be implemented as a voice switch, an SS7 switch, or a computer connected to a switch. SSPs 308 and 310 exchange SS7 signal units to support a telephone call between calling party 120 and user 110. For example, SSPs 308 and 310 may exchange SS7 messages, such as TCAP messages, within message signal units ("MSU") to control calls, perform database queries to configuration database 312, and provide maintenance information.

Line Information Database (LIDB) 312 comprises one or more known databases to support the features of voice network 104. For example, LIDB 312 may include subscriber information, such as a service profile, name and address, and credit card validation information. Although, in this figure, LIDB 312 is illustrated as directly connected to ISCP 302, LIDB 312 may be connected to ISCP 302 through an STP (e.g., 304 and 306). Additionally, this communication link may use, for example, the GR-2838 General Dynamic Interface (GDI) for SS7.

ISCP Service Provisioning and Creation Environment (SPACE) 314 may be included as part of ISCP 302 or be separate from the ISCP 302. For example, the Telcordia™ ISCP may include an environment similar to SPACE 314 as part of the product. Further, ISCP SPACE 314 may include one or more servers. ISCP SPACE 314 is the point in the ISCP platform where customer record updates may be made.

In one embodiment, customer records may be stored in the ISCP SPACE 314 such that the records may be updated and sent to ISCP 302. These records may include information regarding how to handle calls directed to the customer. For example, these customer records may include information regarding whether or not calls for the customer are to be forwarded to a different number, and/or whether or not the call should be directed to an IP, such as a voice mail system, after a certain number of rings. Additionally, one ISCP SPACE 314 may provide updates to one or more ISCPs 302 via an ISCP network (not shown).

Additionally, voice network 104 may include one or more recent change engines 316 such as, for example, an Enterprise Recent Change engine (eRC); an Assignment, Activation, and Inventory System (AAIS); or a multi-services platform (MSP). As an example, the eRC and MIS may be used in voice networks 104 located in the western part of the United States, while an MSP may be used in networks in the eastern part. The recent change engines may be used to update switch and ISCP databases. For example, a recent change engine may deliver database updates to SSPs and to ISCPs, such that when updating databases, these recent change engines emulate human operators. Additionally, if the instructions are to be sent to an ISCP 302, the recent change engine may first send the instructions to ISCP SPACE 314, which then propagates the instructions to ISCP 302 as discussed above. Further, an MSP or eRC may be used, for example, for providing updates to both SSPs 308 or 310 and ISCPs 302. Or, for example, an eRC may be used for providing updates to SSPs 308 or 310, while an AAIS is used for providing updates to ISCPs 302.

Updates sent to SSPs 308 or 310 may be sent from recent change engine 316 via a switch access 322 that may, for example, convert the updates into the appropriate protocol for SSP 308 or 310. For example, recent change engine 316 may send updates to SSPs 308 or 310 via TCP/IP. Switch access 322 may then convert the updates from TCP/IP to X.25. This switch access 322 may be implemented using hardware and/or software. These connections may include any number of elements, such as, for example, switches, routers, hubs, etc. and may be, for example, an internal data network for voice network 104.

Voice network 104 may also include one or more intelligent peripherals (IP). For example, in FIG. 3, an IP 320 is illustrated as being connected to SSP 308. These IPs may be used for providing functions for interaction between users and the voice network, such as voice mail services, digit collection, customized announcements, voice recognition, etc. Moreover, the communications between SSP 308 and IP 320 may use the Primary Rate interface (PRi) (e.g., the 1129 protocol) protocol. Additionally, IP 320 may be capable of sending and receiving information to/from Service Center 106. These communications may use, for example, the SR-3511 protocol. Further, although FIG. 3 illustrates this connection as a direct connection, this connection may include any number of elements including routers, switches, hubs, etc., and may be via, for example, an internal data network for voice network 104. In one embodiment, IP 320 may be operable to play various announcements to a calling party during a call screening operation consistent with the principles of the present invention.

Figure 4:
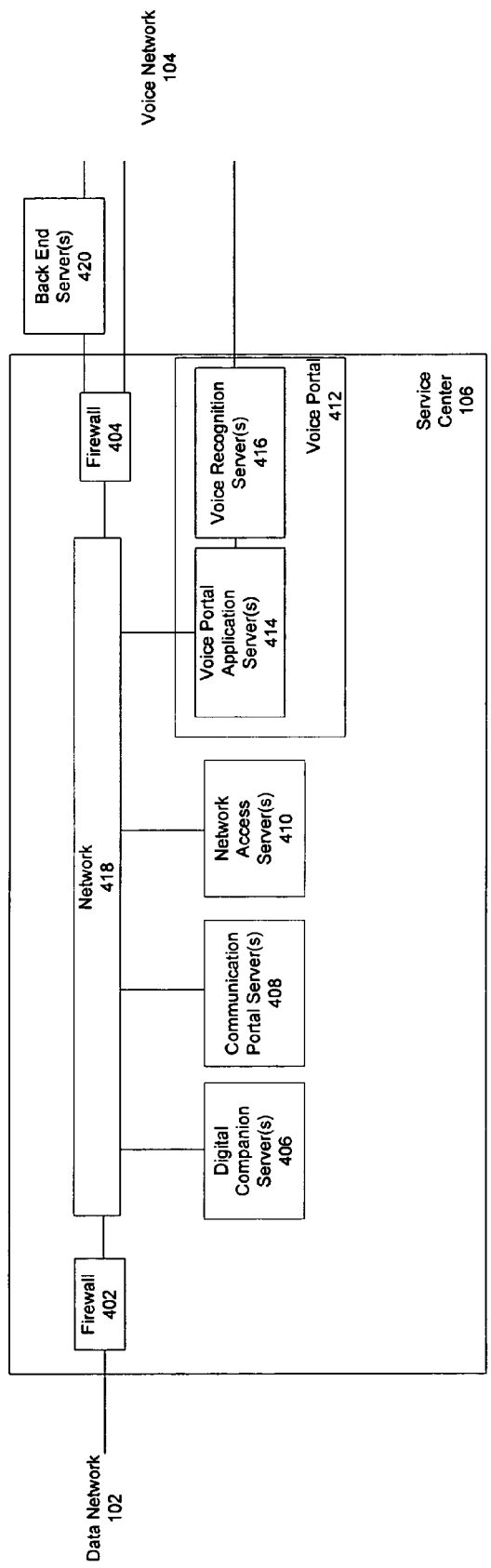
FIG. 4 is a block diagram of a service center, consistent with the principles of the present invention.

FIG. 4 is a block diagram of a service center, consistent with the principles of the present invention. As shown, service center 106 may include firewalls 402 and 404, one or more digital companion servers 406, one or more communication portal servers 408, one or more network access servers 410, and a voice portal 412. The voice portal 412 may include a voice portal application server 414 and a voice recognition server 416. A network 418 may be used to interconnect the firewalls and servers. Additionally, back end server(s) 420 may be provided between the service center 106 and the voice network 104.

Firewalls 402 and 404 provide security services for communications between service center 106, data network 102, and voice network 104, respectively. For example, firewalls 402 and 404 may restrict communications between user terminal 112 and one or more servers within service center 106. Any appropriate security policy may be implemented in firewalls 402 and 404 consistent with the principles of the present invention. Firewalls 402 and 404 may be implemented using a combination of known hardware and software, such as the Raptor Firewall provided by the Axent Corporation. Further, firewalls 402 and 404 may be implemented as separate machines within service center 106, or implemented on one or more machines external to service center 106.

Network 418 may be any type of network, such as an Ethernet or FDDI network. Additionally, network 418 may also include switches and routers as appropriate without departing from the scope of the invention. Further, additional firewalls may be present in the network 418, for example, to place one or more of servers 406, 408, 410, or voice portal 412 behind additional firewalls.

Each server (406, 408, 410, 414, 416, 420) may be any appropriate type of server or computer, such as a Unix or DOS-based server or computer. The servers may implement various logical functions, such as those described below. In FIG. 4, a different server is illustrated as being used for each logical function. In other embodiments, the logical functions may be split across multiple servers, multiple servers may be used to implement a single function, all functions may be performed by a single server, etc.

In general, a digital companion server 406 may provide the software and hardware for providing specific services of the service center. Exemplary services include, for example, permitting a customer to add contacts to their address book from a history of calls made or received by the customer, permitting a customer to make calls directly from their address book, scheduling a call to be placed at a specific time, or permitting the customer to look at the name and/or address associated with a phone number. Additionally, these services may include permitting the customer to listen to their voice mail on-line, forwarding their calls based on a scheduler and/or the calling parties number, setting up conference calls on-line, real-time call management, call screening, etc. In one embodiment, real-time call management enables a customer to perform several functions as a call is being received, such as sending a call to voice mail, sending a call received on one device to another device, manually initiating call screening, playing an announcement for the caller, scheduling a call back, bridging a caller onto a current call, etc. Call screening consistent with the present invention may enable a customer, for example, to manually or automatically force callers with unknown or blocked numbers to identify themselves before being allowed to complete a phone call to the customer. A customer may be a user that subscribes to various services of service center 106.

A communication portal server 408 may provide the hardware and software for managing a customer's account and interfacing with customer account information stored by the provider of customer's voice network 104. Network access servers 410 may provide the hardware and software for sending and receiving information to voice network 104 in processing the applications provided by service center 106. For example, network access servers 410 may be used for transmitting and/or receiving information from/to an ISCP 302 or an SSP 308 or 310 of voice network 104.

Voice portal 412 includes software and hardware for receiving and processing instructions from a customer via voice. For example, a customer may dial a specific number for voice portal 412. Then the customer using speech may instruct service center 106 to modify the services to which the customer subscribes. Voice portal 412 may include, for example, a voice recognition function 416 and an application function 414. Voice recognition function 416 may receive and interpret dictation, or recognize spoken commands. Application function 414 may take, for example, the output from voice recognition function 416, convert it to a format suitable for service center 106 and forward the information to one or more servers (406, 408, 410) in service center 106.

Figure 5:
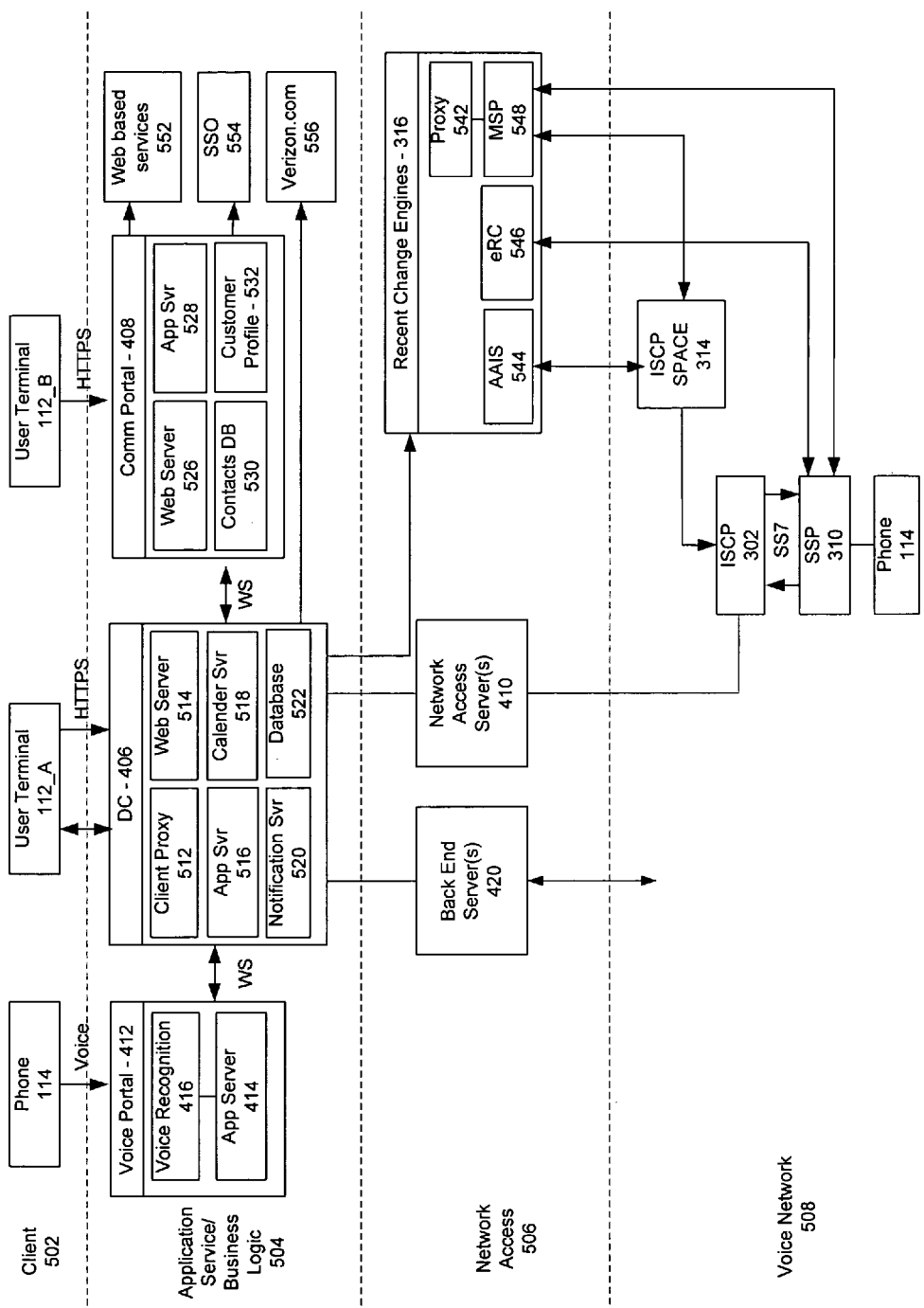
FIG. 5 illustrates a logical architecture of an exemplary system, consistent with the present invention.

FIG. 5 illustrates a logical architecture of an exemplary system, consistent with the present invention. As illustrated, the logical architecture may be split into four planes: client side 502, application service 504, network access 506, and the voice network 508.

Client side 502 includes user terminals 112_A and 112_B that a user may use to send and/or receive information to/from the service center 106. Additionally, client side 502 includes the user's phone(s) 114. As discussed above, user terminals 112 may be any type of device a user may use for communicating with Service Center 106. For example, user terminal 112_A may be a PDA running a program for communicating with the Service Center 106, while user terminal 112_B may be a desktop type computer running a web browser for communicating with the Service Center 106 via the Internet. Additionally, the user may have one or more phones 114, such as, for example, one or more standard landline telephones and/or wireless phones.

Application service plane 504 includes digital companion server(s) 406, communication portal server(s) 408, and voice portal 412. These entities may communicate between one another using, for example, web services or any other suitable protocols. Web services are a standardized way of integrating Web-based applications using the Extensible Markup Language (XML), Simple Object Access Protocol (SOAP), Web Services Description Language (WSDL) and Universal Description, Discovery and Integration (UDDI) open standards over an Internet protocol (IP) backbone.

As illustrated, a digital companion server 406 may provide the following functions: a client proxy 512, a web server 514, an application server function 516, a calendar server function 518, a notification server function 520, and a database function 522. Each of these functions may be performed in hardware, software, and/or firmware. Further, these functions may each be executed by a separate server, split across multiple servers, included on the same server functions, or any other manner.

Client proxy function 512 provides a proxy function for the digital companion that may be used for security purposes. This client proxy function 512 may be included in a separate server such that all communications sent from the other digital companion functions/servers to a user terminal 112 via data network 102 go through client proxy 512. Also, if client proxy 512 is included on a separate server, for example, an additional firewall may be provided between the client proxy 512 and the other digital companion servers to provide additional security.

Web server 514 provides functionality for receiving traffic over data network 102 from a customer. For example, web server 514 may be a standard web server that a customer may access using a web browser program, such as Internet Explorer or Netscape Communicator.

Application server function 516 encompasses the general functions performed by digital companion server(s) 406. For example, these functions may include interfacing with the various other digital companion functions to perform specific services provided by the service center. These services may include, for example, interfacing with other function(s), software, and/or hardware to provide a customer with the capability of managing their calls online. For example, permitting a customer to add contacts to their address book from a history of calls made or received by the customer, permitting a customer to make calls directly from their address book, scheduling a call to be placed at a specific time, or permitting the customer to look at the name and/or address associated with a phone number. Additionally, these services may include permitting the customer to listen to their voice mail on-line, forwarding their calls based on a scheduler and/or the calling parties number, setting up conference calls on-line, enabling call management with user intervention in real-time, call screening, etc.

Additionally, application server function 516 may interface with one or more external devices, such as an external web server, for retrieving or sending information. For example, application server function 516 may interface with a voice network's data center 556 (e.g., verizon.com) to determine the services to which the customer subscribes (e.g., call waiting, call forwarding, voice mail, etc.).

Calendar server function 518 may provide the capability of scheduling events, logging when certain events occurred, triggering the application-functions to perform a function at a particular time, etc.

Notification server function 520 provides the capability to send information from service center 106 to a user terminal 112. For example, the notification server function 520 at the direction of the application server function 516 may send a notification to the user terminal 112 that the user (e.g., customer) is presently receiving a phone call at the user's phone 114. This notification may be, for example, an instant message pop-up window that provides an identification of the caller as well as the number being called. The notification may also have a number of user-selectable buttons or items associated with it that enable the user (e.g., customer) to manage a call in real-time.

Database function 522 provides the storage of information useable by the various applications executed by the digital companion servers. These databases may be included in, for example, one or more external storage devices connected to the digital companion servers. Alternatively, the databases may be included in storage devices within the digital companion servers themselves. The storage devices providing the database function 522 may be any type of storage device, such as for example, CD-ROMs, DVD's, disk drives, magnetic tape, etc.

As discussed above, the communication portal server(s) 408 provide the hardware and software for managing a customer's account and interfacing with customer account information stored by the provider of customer's voice network 104. As illustrated in FIG. 5, a communication portal server 408 may provide the following functions: a web server function 526, an application server function 528, a contacts database function 530, and/or a customer profile function 532. Each of these functions may be performed by a separate server, split across multiple servers, included on the same server functions, or any other manner.

Web server function 526, as with web server function 514 of the digital companion servers, provides functionality for receiving traffic over the data network 102 from a customer. For example, web server function 514 may be a standard web server that a customer may access using a web browser, such as Internet Explorer or Netscape Communicator.

Application server function 528 encompasses the general functions performed by communication portal servers 408. For example, these functions may include interfacing with the voice network to retrieve and/or modify customer profile information, and creating and editing an address book for the user. Additionally, application server function 528 may include the functionality of sending and/or receiving information to/from external servers and/or devices. For example, communication portal servers 408 may be connected to a network, such as, the Internet. Application server function 528 may then provide connectivity over the Internet to external servers 552 that provide web services, such as the Superpages web page. Application server function 528 could then contact these external services 552 to retrieve information, such as an address for a person in the user's address book.

In another example, application server function 528 of communication portal 408 may interface a single sign on (SSO) server 554. SSO 554 may be used to allow users to access all services to which the user subscribes, on the basis of a single authentication that is performed when they initially access the network.

Moreover, application server function 528, similar to application server 516, may provide functionality to facilitate services performed by the service center. These services may include, for example, interfacing with other function(s), software, and/or hardware to provide a customer with the capability of managing their calls online. For example, permitting a customer to add contacts to their address book from a history of calls made or received by the customer, permitting a customer to make calls directly from their address book, scheduling a call to be placed at a specific time, or permitting the customer to look at the name and/or address associated with a phone number. Additionally, these services may include permitting the customer to listen to their voice mail on-line, forwarding their calls based on a scheduler and/or the calling parties number, setting up conference calls on-line, enabling call management with user intervention in real-time, call screening, etc.

Contacts database 530 includes storage devices for storing an address book for the user. This address book may be any appropriate type of address book. For example, the user's address book may include the names, phone numbers, and addresses of people and/or organizations. These storage devices may be internal or external to communication portal servers 406 or some combination in between. In addition, these storage devices may be any type of storage device, such as magnetic storage, memory storage, etc.

Customer profile database 532 includes storage devices for storing customer profile information for the user. These storage devices may be the same or separate storage devices used for the contacts database. The customer profile may include information regarding the user's account for their voice network. For example, this information may include the user's name, billing address, and other account information. Additionally, the customer profile may include information regarding voice services to which the user subscribes, such as, for example, call waiting, voice mail, etc.

Application services plane 504 of the architecture may also include voice portal 412. As discussed above, voice portal 412 may include, for example, a voice recognition function 416 and an application server function 414, and be used for receiving and processing instructions from a customer via voice. The voice recognition function may be implemented using hardware and/or software capable of providing voice recognition capabilities. This hardware and/or software may be a commercially available product, such as the Voice Application platform available from Tellme Networks, Incorporated. Application server function 414 of voice portal 412 may include hardware and/or software for exchanging information between digital companion servers 406 and voice recognition function 416. Additionally, application server function 414 may be included on a separate server, included in the hardware and software providing voice recognition function 416, included in digital companion servers 406, etc.

Network Access plane 506 of the architecture includes the functions for providing connectivity between application service plane 502 and voice network 104. For example, this plane may include recent change engines 316, network access servers 410, and/or back end servers 420.

As discussed above, recent change engines 316 may be used to update switches and ISCP databases included in the voice network 104. In one embodiment, recent change engines 316 may include an AAIS 544, an eRC 546, and/or an MSP 548. Additionally, a proxy 542 may be used between digital companion servers 406 and recent change engines 542 for security purposes.

Network access servers 410 may be included in service center 106 and may provide the hardware and software for sending and receiving information to voice network 410 in processing the applications provided by the service center. For example, network access servers 410 may include a Caller ID (CID) functionality for retrieving caller ID information from voice network 104, a click to dial (CTD) functionality for instructing an intelligent peripheral (IP) in voice network 104 to place a call via an SSP, a real time call management (RTCM) functionality for interfacing with an ISCP of the voice network, and/or an additional call screening functionality for protecting users from callers with blocked, unknown, or otherwise undesirable numbers.

Network Access plane 506 may also include one or more back end server(s) 420. These back end server(s) 420 may include hardware and/or software for interfacing service center 106 and voice network 104. Back end server(s) 420 may be connected to service center 106 by a network, by a direct connection, or in any other suitable manner. Further, back end server(s) 420 may connect to one or more devices in voice network 104 by a network, a direct connection, or in any other suitable manner.

Back end server(s) 420 may include, for example, a server providing a voice mail retrieval and notification function. This voice mail retrieval and notification function may include the capability to receive notifications when a user receives a voice mail, physically call a user's voice mail system, enter the appropriate codes to retrieve the voice mail, retrieve the voice mail, convert the voice mail to a digital file, and send it to digital companion servers 406.

Additionally, these back end server(s) 420 may also include, for example, a directory assistance server. This directory assistance server may interface service center 106 with a Reverse Directory Assistance Gateway (RDA Gateway) of voice network 104. An RDA Gateway is a device for issuing requests to a Data Operations Center (DOC) of voice network 104 for name and/or address information associated with a phone number and receiving the name and/or phone number in response to this request.

In another example, back end server(s) 420 may include a wireless internet gateway that is used for interfacing with a mobile switching center (MSC) of a wireless voice network. As with above-described back end server(s) 420, this wireless internet gateway may be used for converting requests and information between the formats used by service center 106 and those used by the wireless voice network.

In yet another example, back end server(s) 420 may include a conference blasting server for instructing a conference bridge in voice network 106 to dial out via an SSP to the participants of a voice conference. Alternatively, for example, the back end server(s) may include a server for instructing an IP of the voice network to place a call between two parties by dialing out to each of the parties. The back end server(s) may also include the capability to instruct the bridge or IP device to call an audio digitizing device that can listen to the conference, convert the audio signals to digital format, and forward the digitized signals to a user device via, for example, an audio streaming server. The audio streaming server may, for example, allow a user to connect to it via, for example, the Internet. Additionally, the audio streaming device may buffer or record the signals to permit the user to pause, rewind, and/or fast-forward thru the conference.

In yet another example, back end server(s) 420 may include a Single Number Short Message Service (SN SMS) server for interfacing service center 106 with a Short Message Service (SMS) gateway in voice network 104. This may be used to permit the customer to have SMS messages addressed to their home phone number directed to an SMS capable device of the users choosing.

Voice network plane 508 includes the hardware and software included in the voice network 104, as discussed above with reference to FIG. 3. For example, voice network plane 508 may include ISCP SPACE 314, ISCP 302, intelligent peripherals 320, and SSP 308. Additionally, voice network plane 508 may also include the hardware and software included in a wireless carrier's network, such as, for example, the mobile switching center, etc.

System Operation

Figure 6A:
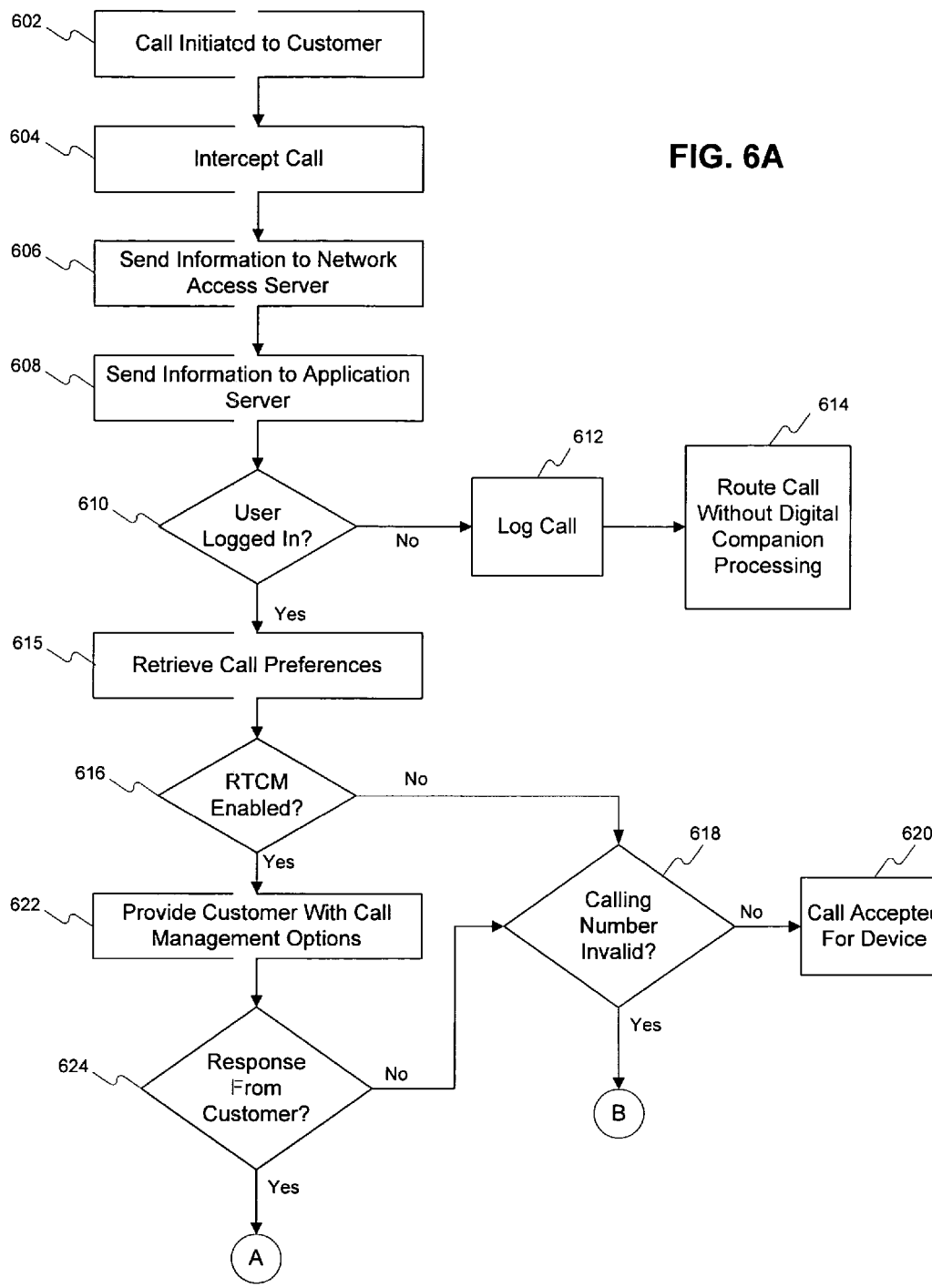
FIGS. 6A and 6B comprise a diagram of an exemplary flowchart of a method for preemptively rejecting phone calls in a manner consistent with the present invention.
Figure 6B:
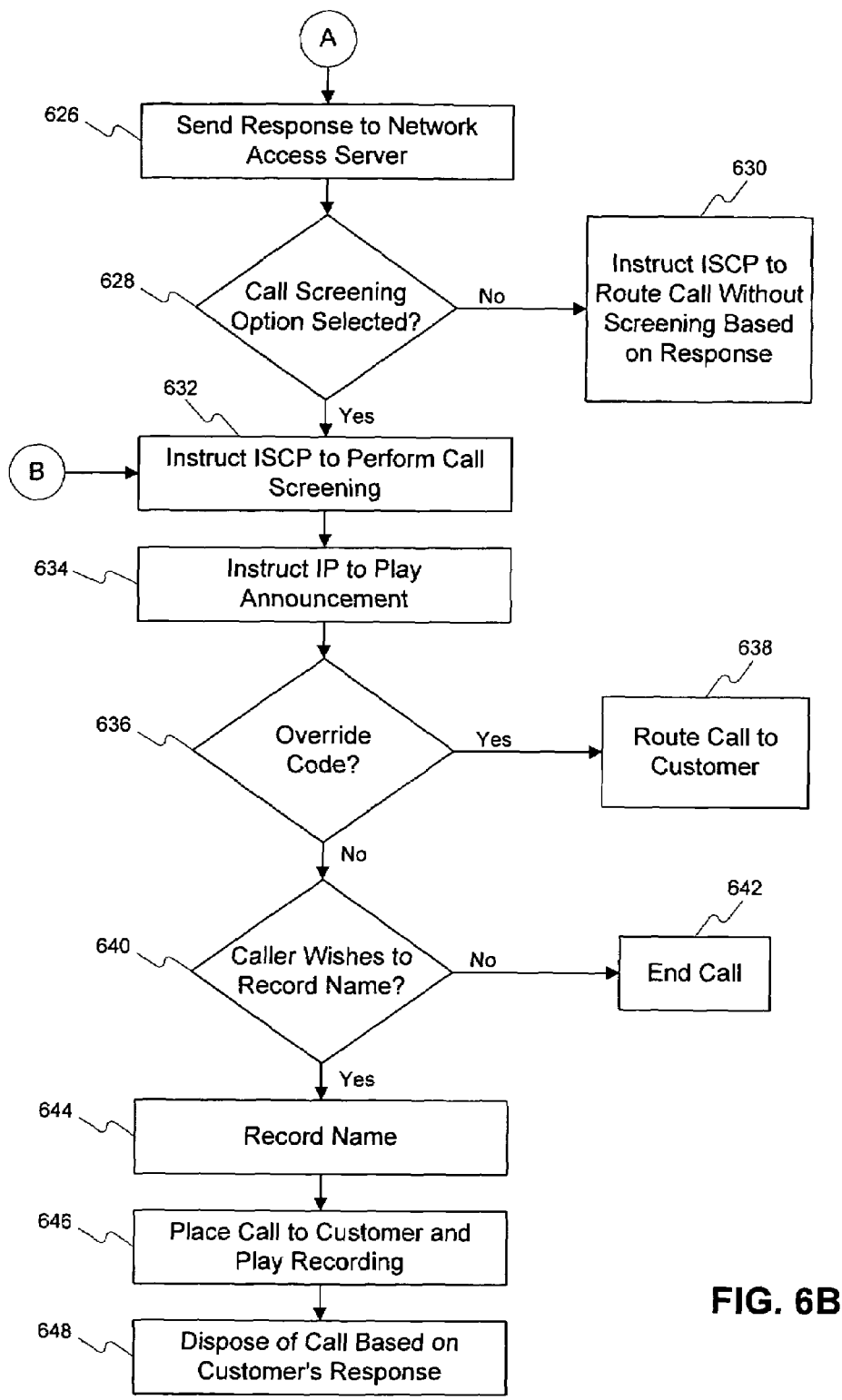

FIGS. 6A and 6B comprise a diagram of an exemplary flowchart of a method for preemptively rejecting phone calls in a manner consistent with the present invention. Although the steps of the flowchart are described in a particular order, one skilled in the art will appreciate that these steps may be performed in a modified or different order. Further, one or more of the steps in FIGS. 6A and 6B may be performed concurrently or in parallel.

As illustrated in FIGS. 6A and 6B, a calling party first initiates a call to a customer (step 602). For example, a calling party 120 may use a phone, such as phone 122, to place a call to phone 114 of a customer, such as user 110. In one embodiment, the call may be routed from a phone to a voice network, such as voice network 104, where an SSP 308 or 310 may intercept the call (step 604). SSP 308 or 310 may intercept the call because it encountered a "trigger," such as a terminating attempt trigger or a specific digit string trigger, associated with the call. For example, a trigger may be set at SSP 308 or 310 on each of the lines corresponding to a digital companion customer. In this manner, a trigger is set to detect calls received at the SSP that are directed to telephone numbers of digital companion customers. In addition, triggers may be set on lines corresponding to digital companion customers that have the call screening enabled. As such, calls to telephone numbers associated with digital companion customers having call screening are detected by the triggers. For the purposes of this description, it is those calls that the SSP intercepts.

After intercepting the call, SSP 308 or 310 sends a query to ISCP 302 requesting further instructions. In response, ISCP 302 sends call information to a network access server 410 (step 606). In one embodiment, the call information may be sent to network access server 410 via a Generic Data Interface (GDI), using a message structure associated with GDI (e.g., GetData, SendData, or InvokeApp). The call information may also be sent in an encrypted form.

The call information may include, for example, call state data, a call intercept parameter, a voice mail parameter, time zone data, user ID, called number data, calling name data, calling number data, and calling party number (CPN) presentation information. One of ordinary skill in the art will appreciate that additional information may be included with the call information, or that some of the previously noted information may be omitted from the call information.

Call state data may provide the current call state based on processing (e.g., AIN processing) that has already occurred for the call. For example, some possible values for call state data may be indicative of a call being authorized for termination, a call being to a call intercept (CI) service node or IP, a call being from a CI service node or IP, a call being a priority call from the CI service node or IP, a call having a CI error encountered on a call to a CI service node or IP, or a call being on the first leg of a click-to-dial call.

The call intercept parameter identifies when a customer has subscribed to the call intercept feature. In one embodiment, a call intercept feature allows a customer to block invalid numbers that typically appear as "unavailable," "private," "anonymous," or "out of area" on a caller ID display. The feature may tell callers that unidentified calls are not accepted and ask them to record a name. If an unidentified caller does not record a name or enter an override code, the called party's phone will not ring, thus eliminating interruptions from unidentified callers. This feature is separate from the call screening feature consistent with the present invention, though the features share some functionality.

The voice mail parameter identifies when a subscriber has voice mail capability. Time zone data refers to the customer's time zone. Called number data refers to the number of a called device associated with the subscriber. User ID refers to a parameter that may have one of two values. If a distinctive ring feature is present, then user ID is set to a primary number value. If no such feature is present, then user ID is set to the same value as the called number. Distinctive ring, for example, may provide a customer with additional telephone numbers on a single line, with their own unique ringing pattern. A customer's primary number is the main number associated with the line.

Calling number data refers to the number of the calling party 120. This parameter may contain such a number when it is available. In addition, the parameter may contain a calling party address when the information is made available by a previously executed AIN service. Otherwise, the calling number parameter may include some arbitrary string of digits or characters (e.g., ten zeros) when the caller ID information does or does not match a particular format.

Calling name data refers to the name of the calling party. This parameter may be retrieved, for example, by ISCP 302 from a database such as LIDB 312. It may be typically possible to retrieve the calling name when the database was populated with this data by a previously executed AIN service. If the calling name is not successfully retrieved, then the calling name parameter may include, for example, an arbitrary string of digits or characters (e.g., zeros) indicative of situations where there was no response from LIDB 312, there was an erroneous response from LIDB 312, there was no name returned from LIDB 312, the format of the caller ID is not in conformance, or the caller ID presentation is restricted.

ISCP 302 may also send an announcement to an SSP where the call is being handled. The announcement can be some kind of recording that is played for the calling party. This announcement has the effects of preventing a call timer in the SSP from expiring and giving the calling party an indication that the call is progressing. ISCP 302 may continue to cause the announcement to be played while waiting for a response from network access server 410.

Upon receiving the call information from ISCP 302, network access server 410 may decrypt the information, if necessary, and forward the received information to application server 516 (step 608). Application server 516 may then determine whether the customer associated with the triggered phone number (e.g., destination/dialed phone number) is logged into a digital companion server 406 (step 610). Application server 516 makes this determination, for example, by performing a lookup in a database, such as database 522, using the called number as an index. Based on the called number, application server 516 can determine a digital companion customer ID. This digital companion customer ID may have a number of access points (e.g., user terminals 112) associated with it. Application server 516 may lookup entries in database 522 that correspond to the digital companion customer ID to determine whether the customer is currently logged onto a digital companion server 406 using any access points. For example, whenever a customer is logged on using an access point, an indication of such is stored in database 522. If application server 516 finds such an indication in database 522, then it knows that the customer is logged on, and it knows which access point the customer is using.

If the customer is not logged on anywhere, then there is no way for service center 106 to communicate with the customer using digital companion operations. Instead, service center 106 logs the call (step 612). When the customer logs in at a later time, the customer is provided with an indication that the customer was called. Calls may be logged, for example, in database 522 or in other storage on digital companion server 406 or communication portal server 408. The call may be subsequently routed without digital companion processing (e.g., call may be completed as dialed, if possible) (step 614).

If the customer is logged on, then application server 516 retrieves call preference information from a database (step 615). In one embodiment, the database storing this call preference information may be database 522, customer profile database 532, or another database used to stored customer-related data. The call preference information may include, for example, call block lists, lists of forwarding devices or telephone numbers, voice mail preferences, lists of recordings that the customer can set as pre-recorded messages, etc.

A determination is also made as to whether RTCM is enabled for this customer (step 616). Such as determination may be made, for example, using triggers to detect calls to digital companion customers having the real-time call management feature enable. As such, one of ordinary skill in the art will appreciate that by the time application server 516 retrieves call preferences in step 615, it may already be known whether the customer has the RTCM feature enabled.

If the RTCM feature is enabled for this customer, then application server 516 may proceed to provide the customer with appropriate call management options (step 622). As part of this step, application server 516 may proceed to determine whether the call screening, call intercept feature, and/or voice mail features are enabled for the called party by examining the call information received from the network access server 410. Application server 516 makes this determination so that it knows which options should be made available to a called party using RTCM. One of ordinary skill in the art will appreciate that the application server 516 may also check for any other feature that can be enabled and disabled. Application server 516 also determines the CPN presentation value associated with the call by examining the call information received from network access server 410. The CPN presentation value is determined so that the calling party's CPN information can either be displayed or not displayed for the customer.

Thereafter, application server 516 may provide the collected information (e.g., call information, call preference information, and access point information) to notification server 520 and instruct notification server 520 to send an RTCM notification to the customer associated with the called number (e.g., by providing an indication of the access point that the customer is using to the notification server 520). Notification server 520 has open connections to all devices (e.g., user terminals 112) that are logged on. When notification server 520 receives information from application server 516, it uses the information to route an RTCM notification to the customer at the appropriate access point (e.g., user terminal 112). In one embodiment, the RTCM notification may be sent using a protocol such as HTTP (Hypertext Transfer Protocol), Java, or a similar protocol.

The RTCM notification may be a notification of the incoming call to the customer. The notification may include a display having a number of customer-selectable buttons associated with it that enable the customer to manage a call in real-time. For example, the notification may have different buttons that permit a customer to send a call to voice mail, send a call received on one device to another device, perform a call screening operation, accept a call, play an announcement, place a call on hold, schedule a call back operation, perform an automatic call back operation, perform a call block operation, or bridge a caller onto the current call (e.g., initiate a conference call).

The notification may provide the customer with different options dependent on the features for which the customer is authorized and has enabled. For example, if the customer does not have call screening enabled, then the RTCM notification will not include a user-selectable area corresponding to the call screening operation. If the customer does not have voice mail enabled, then the RTCM notification will not include a user-selectable area corresponding to voice mail. One of ordinary skill in the art will appreciate that any feature that can be enabled and disabled may be used as a basis for altering the RTCM notification (e.g., conference call, etc.).

Once it has received the RTCM notification, the customer's selected device displays the RTCM notification, including the customer-selectable buttons associated with it. The device does not yet ring. Even though the device is not yet ringing, the caller may hear on the calling device (e.g., the phone or other device used to place the call) a ringing tone or an announcement indicating that the call is proceeding. Network access server 410 then waits for a response from the customer (step 624). Response information may include, for example, call disposition information, forwarding number information, nature of forwarding number information, carrier access code, announcement type, and ring cadence. One of ordinary skill in the art will appreciate that additional data may be included with the response data, or that some of the previously noted data may be omitted from the response data.

Call disposition information may provide an indication of the customer's choice for how the call should be handled. For example, call disposition information may include an indication of sending a call to voice mail, sending a call received on one device to another device (e.g., call forwarding), performing a call screening operation, accepting a call, playing an announcement, placing a call on hold, scheduling a call back operation, performing an automatic call back operation, performing a call block operation, or bridging a caller onto the current call.

When a call forwarding operation is invoked, forwarding number information includes a number to which the call should be forwarded. Nature of forwarding number information identifies the nature of the call forwarding number. For example, a number may be a national number or an international number.

Carrier access code may be a sequence of digits indicative of a specific carrier when a call should be routed using the specific carrier.

Announcement type identifies an announcement that should be played to the caller. This parameter, for example, may be used when the customer selects the play announcement option.

Ring cadence may be indicative of the ring cadence value that should be applied for the call. For example, different values may be used to designate normal cadence; short, short cadence; and short, short, long cadence; or any other possible cadences.

If, after a predetermined period of time, the notification server 520 has not received a response, then a determination is made as to whether the number belonging to the calling party is invalid (step 618). For example, application server 516 may decide whether a calling party number is blocked or otherwise unavailable. If the number is blocked or unavailable, then the process proceeds to step 632, described below. If the number is not blocked or unavailable, then the call is accepted for the device receiving the call (step 620). For example, after a period of time, the RTCM notification, if any, may disappear from the device's display and the device may start ringing (e.g., if there is no RTCM notification, ringing may occur right away). The customer may answer the call if he or she is available and chooses to do so. One of ordinary skill in the art will appreciate that other default actions may occur instead of allowing the call to go through. For example, a busy signal may be played, the call may be sent to voice mail, the call may be forwarded to a preferred forwarding number, an announcement may be played, etc.

If the customer responds by selecting one of the RTCM options, then the RTCM notification disappears from the display, and network access server 410 receives the response and encrypts it, if necessary (step 626). Network access server 410 proceeds to instruct ISCP 302 to route the incoming call based on the response from the customer. In one embodiment, network access server 410 instructs ISCP 302 by sending ISCP 302 the response information via a connection such as a GDI link. The ISCP 302 may decrypt the response data, if necessary, and route the call based on the response. For example, the service logic associated with ISCP 302 may take different actions based on the call disposition information and other information included in the response. If a call screening option is not selected (step 628—No), then ISCP 302 may route the call without screening it (step 630). Exemplary call routing options other than call screening include place call on hold, forward call to another device, voice mail, accept call, play announcement, schedule call back, auto call back, conference call, and block call. Further information on each of these options may be found in U.S. patent application Ser. No. 10/721,005, which has already been incorporated by reference.

If the customer selects a call screening option (step 628—Yes), then network access server 410 may instruct ISCP 302 to initiate performance of a call screening operation (step 632). ISCP 302 may then instruct an intelligent peripheral, such as IP 320 to play a recorded announcement for the calling party (step 634). For example, IP 320 may play an announcement requesting that the calling party leaves a spoken name, a PIN (personal identification number), or a voice message. In one embodiment, the announcement may be accompanied by a Special Instruction Tone (SIT) cadence. In this manner, telemarketers or other unwanted callers may be inclined to no longer proceed with the call either because they (e.g., human callers or automatic mechanisms used to call a large number of people in a short period of time) do not want to leave a spoken name or they hear the SIT cadence, which may automatically trigger a mechanism to cease the call. Exemplary SIT cadence may include tones listed in Supplement 2 to ITU-T Recommendation E.180, or other suitable tones.

After playing the announcement, IP 320 determines whether or not an override code (e.g., PIN) has been entered by the calling party (step 636). A customer, for example, may want to give close friends, family, or other important people, such an override code, so that the person has no problem getting through the call screen. If the calling party enters a valid override code, then ISCP 302 proceeds to route the call to the customer (step 638). When the customer either does not enter an override code or enters an invalid override code, a determination is made as to whether the calling party wishes to record a spoken name (step 640).

If the calling party chooses not to record a name, then ISCP 302 promptly ends the call (step 642). The end of the call may be proceeded by an additional announcement informing the calling party that the call is about to end. On the other hand, if the calling party chooses to record a name, then the calling party may proceed to do so (step 644). ISCP 302 may then cause a call to be placed to the customer (e.g., the called party) at the customer's device and play the recording once the customer answers the call (step 646). In one embodiment, the call to the customer's device may be accompanied by a notification that gives the customer the option of accepting the call, diverting the call to voice mail, denying the call, placing the call on hold, playing another announcement, forwarding the call to another device, scheduling a call back, initiating an automatic call back operation, initiating a conference call, etc. One of ordinary skill in the art will appreciate that fewer options or more options may be presented to the customer.

The customer's device may be preset or manually provided by the customer in response to a query. For example, the customer may have a plurality of devices and choose to receive calls at one preferred device when a call screening operation is in progress. One of ordinary skill in the art will appreciate that different preferred devices may be set according to the type of call being received (e.g., type of operation in progress), or the same preferred device may be set regardless of the type of call. Once the customer has made a selection, the call is routed according to that selection (step 648). If the customer fails to respond within a predetermined period of time, the a default action may be initiated. A default action may include diverting the call to voice mail, accepting the call, playing an announcement, etc.

Figure 7:
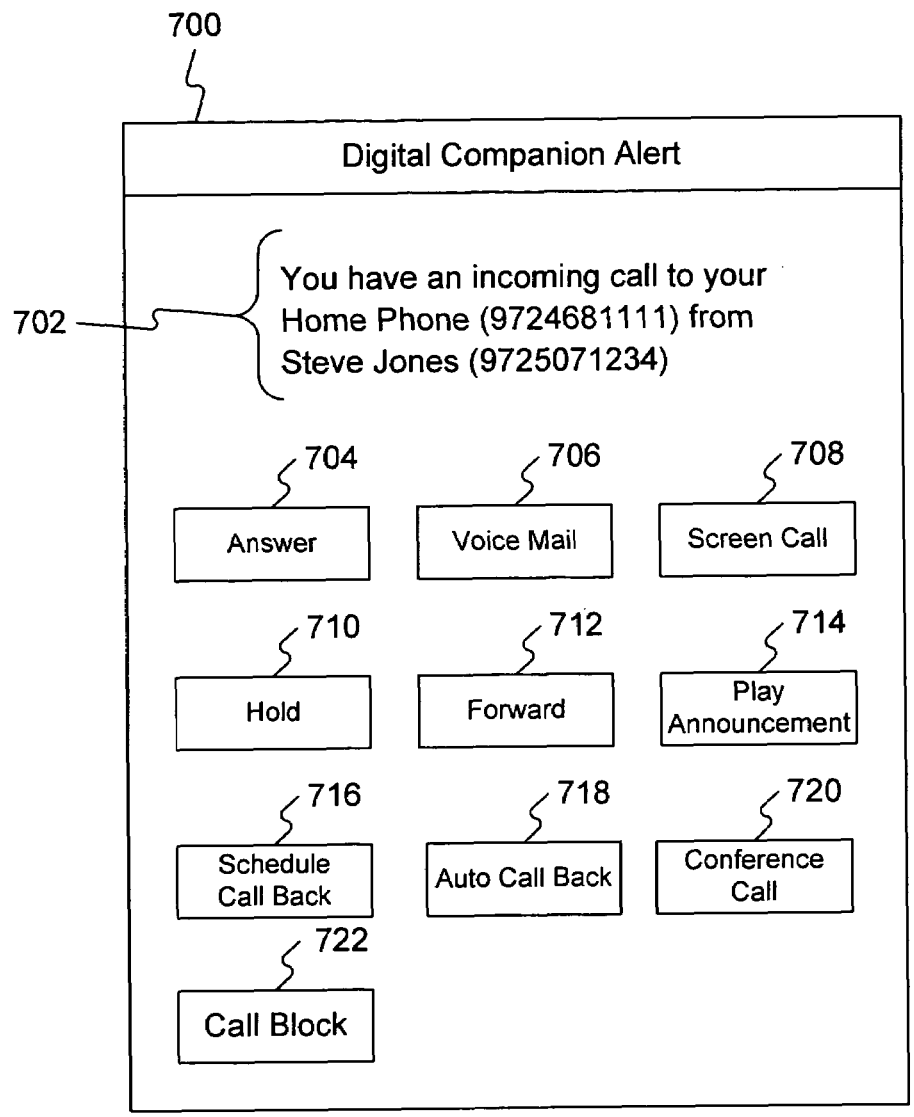
FIG. 7 is a diagram of an exemplary user interface including customer-selectable real-time call management options consistent with the present invention.

FIG. 7 is a diagram of an exemplary user interface 700 including customer-selectable real-time call management options. User interface 700 may be a display on a customer device, such as user terminal 112 or phone 114, that is currently showing an RTCM notification. The RTCM notification includes an area 702 indicating that the customer has an incoming call. Area 702 also provides an identification of the caller as well as the number being called. The number being called may belong to the device displaying the RTCM notification or another device. The RTCM has a number of user-selectable areas 704-722 associated with it, allowing the customer to decide how an incoming call is routed. In one embodiment, the customer may select one of these user-selectable areas through any suitable input methods. For example, the customer may click on the desired option using a mouse, touch an appropriate area of a touchscreen, enter input on a keypad, etc., in order to choose the manner in which the incoming call is routed.

Selecting area 704 enables the customer to answer the call on the device that received the RTCM notification (e.g., the device the includes user interface 700). Selecting area 706 forwards the call to voice mail. Selecting area 708 initiates a call screening feature consistent with the present invention as discussed above with reference to FIGS. 6A and 6B. Selecting area 710 places the call on hold. Selecting area 712 forwards the call to another device of the customer's choosing. Selecting area 714 plays an announcement for the calling party. Selecting area 716 enables a customer to schedule a call back event on a calendar. Selecting area 718 enables a customer to cause the calling party to be automatically called back after the current call. Selecting area 720 bridges call party onto the current call. Selecting area 722 causes a recording to be played indicating that the customer does not wish to speak to the calling party and optionally cause the calling party's telephone number to be added to a call block list.

Figure 8:
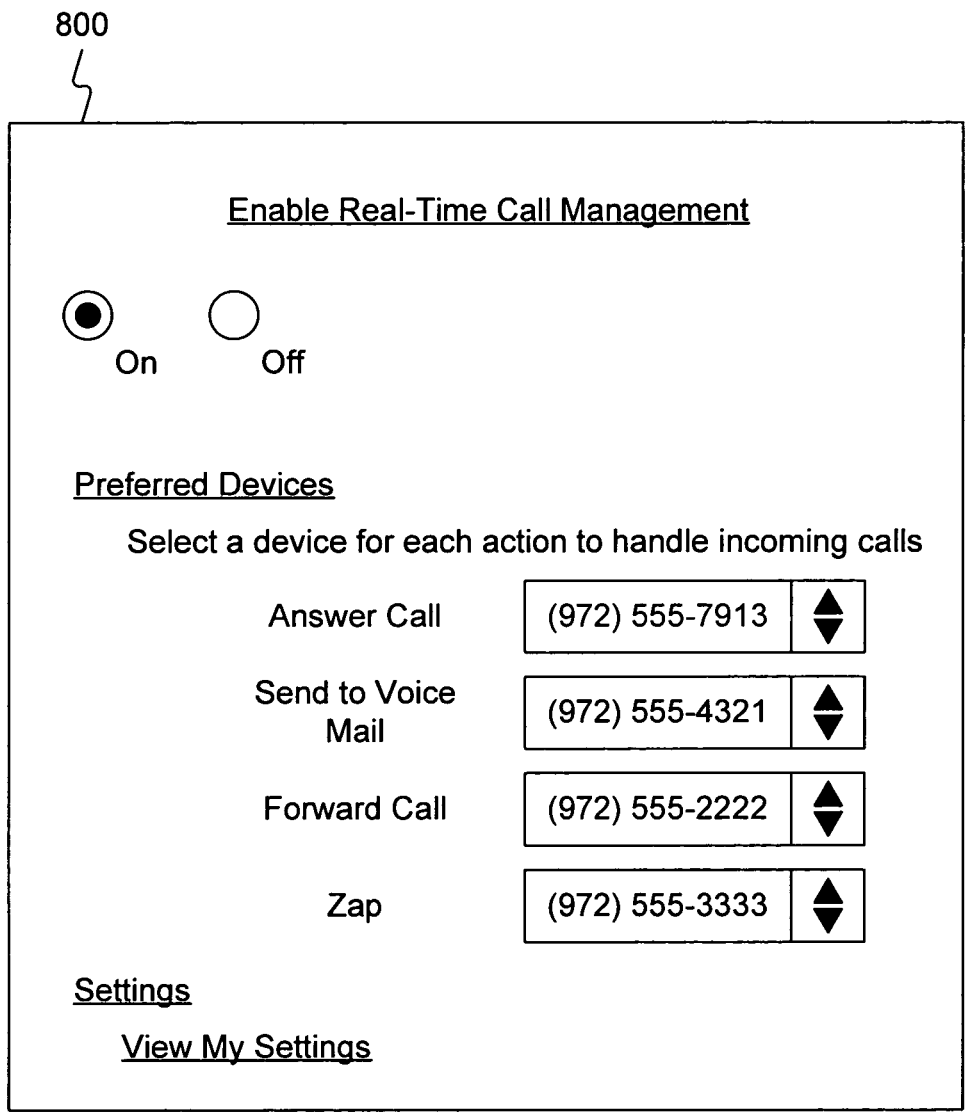
FIG. 8 is a diagram of an exemplary user interface that enables a customer to change preferences consistent with the present invention.

FIG. 8 is a diagram of an exemplary user interface 800 that enables a customer to change preferences consistent with the present invention. As illustrated in FIG. 8, a customer may have the ability to enable or disable real-time call management for a given device. The customer also may select particular devices to handle different actions. For example, a customer may set specific phone numbers to handle features such as answer calls, send to voice mail, forward call, and/or telemarketer zap (e.g., call screening). One of ordinary skill in the art will appreciate that other features may also have phone numbers set for them. The customer also has the option of viewing various other settings associated with the customer, such as a list of numbers that are call blocked, call back settings, etc.

While the present invention has been described in connection with various embodiments, many modifications will be readily apparent to those skilled in the art. One skilled in the art will also appreciate that all or part of the systems and methods consistent with the present invention may be stored on or read from computer-readable media, such as secondary storage devices, like hard disks, floppy disks, and CD-ROM; or other forms of ROM or RAM. Accordingly, embodiments of the invention are not limited to the above described embodiments and examples, but instead is defined by the appended claims in light of their full scope of equivalents.

What is claimed is:

1. A method for screening a call, comprising:
   receiving information pertaining to a call to a user from a calling party;
   determining whether a real-time call management function is enabled for the user;
   determining whether a calling party number associated with the calling party is valid following a determination that the real-time call management function is not enabled, wherein a call screening function is performed when the calling party number is determined to be invalid;
   providing a notification of the call to a device associated with the user following a determination that the real-time call management function is enabled, the notification including a user-selectable call screening option; and initiating the call screening function when the user selects the call screening option.

2. The method of claim 1, comprising:
accepting the call for the device based on a determination that the calling party number is valid.

3. The method of claim 1, comprising:
determining whether a calling party number associated with the calling party is valid based on a determination that the user has not responded to the notification after a predetermined period of time, wherein a call screening function is performed when the calling party number is invalid.

4. The method of claim 1, wherein the call screening function comprises:
playing an announcement to the calling party.

5. The method of claim 4, wherein playing an announcement comprises playing a Special Instruction Tone (SIT) cadence and prompting the calling party to record a name or enter an override code.

6. The method of claim 5, wherein the call screening function further comprises:
routing the call to the device associated with the user based on a determination that the calling party entered a valid override code.

7. The method of claim 5, wherein the call screening function further comprises:
ending the call based on the determination that the calling party does not record a name and does not enter a valid override code.

8. The method of claim 5, wherein the call screening function further comprises:
placing a second call to the user at the device and playing a recording of the calling party when the calling party records a name.

9. The method of claim 8, wherein the call screening function further comprises:
disposing of the call to the user from the calling party based on a response to the second call by the user.

10. A method for screening a call, comprising:
receiving information pertaining to a call to a user from a calling party;
retrieving data corresponding to the user using the information pertaining to the call;
determining whether a real-time call management function is enabled for the user;
determining whether a calling party number associated with the calling party is valid following a determination that the real-time call management function is not enabled, wherein a call screening function is performed when the calling party number is determined to be invalid;
selecting a device associated with the user to receive a notification of the call based on the retrieved data;
providing the notification of the call to the selected device following a determination that the real-time call management function is enabled, the notification including a user-selectable call screening option; and
initiating the call screening function when the user selects the call screening option.

11. The method of claim 10, wherein the call screening function comprises:
playing an announcement to the calling party.

12. The method of claim 11, wherein playing an announcement comprises playing a Special Instruction Tone (SIT) cadence and prompting the calling party to record a name or enter an override code.

13. The method of claim 12, wherein the call screening function further comprises:
routing the call to the device associated with the user based on a determination that the calling party entered a valid override code.

14. The method of claim 12, wherein the call screening function further comprises:
ending the call based on the determination that the calling party does not record a name and does not enter a valid override code.

15. The method of claim 12, wherein the call screening function further comprises:
placing a second call to the user at the device and playing a recording of the calling party when the calling party records a name.

16. The method of claim 15, wherein the call screening function further comprises:
disposing of the call to the user from the calling party based on a response to the second call by the user.

17. An apparatus for screening a call, comprising:
means for receiving information pertaining to a call to a user from a calling party;
means for determining whether a real-time call management function is enabled for the user;
means for determining whether a calling party number associated with the calling party is valid following a determination that the real-time call management function is not enabled, wherein a call screening function is performed when the calling party number is determined to be invalid;
means for providing a notification of the call to a device associated with the user following a determination that the real-time call management function is enabled, the notification including a user-selectable call screening option; and
means for initiating the call screening function when the user selects the call screening option.

18. The apparatus of claim 17, comprising:
means for accepting the call for the device based on a determination that the calling party number is valid.

19. The apparatus of claim 17, comprising:
means for determining whether a calling party number associated with the calling party is valid based on a determination that the user has not responded to the notification after a predetermined period of time, wherein a call screening function is performed when the calling party number is invalid.

20. The apparatus of claim 17, wherein the call screening function comprises:
means for playing an announcement to the calling party.

21. The apparatus of claim 20, wherein means for playing an announcement comprises means for playing a Special Instruction Tone (SIT) cadence and means for prompting the calling party to record a name or enter an override code.

22. The apparatus of claim 21, wherein the call screening function comprises:
means for routing the call to the device associated with the user based on a determination that the calling party entered a valid override code.

23. The apparatus of claim 21, wherein the call screening function comprises:
means for ending the call based on the determination that the calling party does not record a name and does not enter a valid override code.

24. The apparatus of claim 21, wherein the call screening function comprises:
means for placing a second call to the user at the device and playing a recording of the calling party when the calling party records a name.

25. The apparatus of claim 24, wherein the call screening function comprises:
means for disposing of the call to the user from the calling party based on a response to the second call by the user.

26. An apparatus for screening a call, comprising:
means for receiving information pertaining to a call to a user from a calling party;
means for retrieving data corresponding to the user using the information pertaining to the call;
means for determining whether a real-time call management function is enabled for the user;
means for determining whether a calling party number associated with the calling party is valid following a determination that the real-time call management function is not enabled, wherein a call screening function is performed when the calling party number is determined to be invalid;
means for selecting a device associated with the user to receive a notification of the call based on the retrieved data corresponding to the user;
means for providing the notification of the call to the selected device following a determination that the real-time call management function is enabled, the notification including a user-selectable call screening option; and
means for initiating the call screening function when the user selects the call screening option.

27. An apparatus for screening a call, comprising:
a computer readable medium storing a computer program that: receives information pertaining to a call to a user from a calling party; determines whether a real-time call management function is enabled for the user; determines whether a calling party number associated with the calling party is valid following a determination that the real-time call management function is not enabled, wherein a call screening function is performed when the calling party number is determined to be invalid; provides a notification of the call to a device associated with the user following a determination that the real-time call management function is enabled, the notification including a user-selectable call screening option; and initiates the call screening function when the user selects the call screening option; and
a processor that runs the program.

28. An apparatus for screening a call, comprising:
a computer readable medium storing a computer program that: receives information pertaining to a call to a user from a calling party; retrieves data corresponding to the user using the information pertaining to the call; determines whether a real-time call management function is enabled for the user; determines whether a calling party number associated with the calling party is valid following a determination that the real-time call management function is not enabled, wherein a call screening function is performed when the calling party number is determined to be invalid; selects a device associated with the user to receive a notification of the call based on the retrieved data corresponding to the user; provides the notification of the call to the selected device following a determination that the real-time call management function is enabled, the notification including a user-selectable call screening option; and initiates the call screening function when the user selects the call screening option; and
a processor that runs the program.

29. A computer-readable medium encoded with instructions capable of being executed by a computer for performing a method for screening a call, the method comprising:
receiving information pertaining to a call to a user from a calling party;
determining whether a real-time call management function is enabled for the user;
determining whether a calling party number associated with the calling party is valid following a determination that the real-time call management function is not enabled, wherein a call screening function is performed when the calling party number is determined to be invalid;
providing a notification of the call to a device associated with the user following a determination that the real-time call management function is enabled, the notification including a user-selectable call screening option; and
initiating the call screening function when the user selects the call screening option.

30. The computer-readable medium of claim 29, the method comprising:
accepting the call for the device based on a determination that the calling party number is valid.

31. The computer-readable medium of claim 29, the method comprising:
determining whether a calling party number associated with the calling party is valid based on a determination that the user has not responded to the notification after a predetermined period of time, wherein a call screening function is performed when the calling party number is invalid.

32. The computer-readable medium of claim 29, wherein the call screening function comprises:
playing an announcement to the calling party.

33. The computer-readable medium of claim 32, wherein playing an announcement comprises playing a Special Instruction Tone (SIT) cadence and prompting the calling party to record a name or enter an override code.

34. The computer-readable medium of claim 33, wherein the call screening function comprises:
routing the call to the device associated with the user based on a determination that the calling party entered a valid override code.

35. The computer-readable medium of claim 33, wherein the call screening function comprises:
ending the call based on the determination that the calling party does not record a name and does not enter a valid override code.

36. The computer-readable medium of claim 33, wherein the call screening function comprises:
placing a second call to the user at the device and playing a recording of the calling party when the calling party records a name.

37. The computer-readable medium of claim 36, wherein the call screening function comprises:
disposing of the call to the user from the calling party based on a response to the second call by the user.

38. A computer-readable medium encoded with instructions capable of being executed by a computer for performing a method for screening a call, the method comprising:
receiving information pertaining to a call to a user from a calling party;
retrieving data corresponding to the user using the information pertaining to the call;
determining whether a real-time call management function is enabled for the user;

determining whether a calling party number associated with the calling party is valid following a determination that the real-time call management function is not enabled, wherein a call screening function is performed when the calling party number is determined to be invalid;

selecting a device associated with the user to receive a notification of the call based on the retrieved data corresponding to the user;

providing the notification of the call to the selected device following a determination that the real-time call management function is enabled, the notification including a user-selectable call screening option; and initiating the call screening function when the user selects the call screening option.

39. The computer-readable medium of claim 38, wherein the call screening function comprises:

playing an announcement to the calling party.

40. The computer-readable medium of claim 39, wherein playing an announcement comprises playing a Special Instruction Tone (SIT) cadence and prompting the calling party to record a name or enter an override code.

41. The computer-readable medium of claim 40, wherein the call screening function comprises:

routing the call to the device associated with the user based on a determination that the calling party entered a valid override code.

42. The computer-readable medium of claim 40, wherein the call screening function comprises:

ending the call based on the determination that the calling party does not record a name and does not enter a valid override code.

43. The computer-readable medium of claim 40, wherein the call screening function comprises:

placing a second call to the user at the device and playing a recording of the calling party when the calling party records a name.

44. The computer-readable medium of claim 43, wherein the call screening function comprises:

disposing of the call to the user from the calling party based on a response to the second call by the user.

45. A method for screening a call, comprising:

receiving notification of a call to a user at a device associated with the user, the notification including a user-selectable call screening option, the notification being received following a determination that a real-time call management function is enabled for the user, wherein when the real-time call management function is not enabled for the user, a call screening function is performed if a calling party number associated with the calling party is determined to be invalid;

receiving input from the user indicative of selection of the call screening option; and sending, to a server, information reflective of the selection of the call screening option, wherein the server initiates the call screening function responsive to the selection of the call screening option.

46. A device for screening a call, comprising:

a computer readable medium storing a computer program that: receives notification of a call to a user at a device associated with the user, the notification including a user-selectable call screening option, the notification being received following a determination that a real-time call management function is enabled for the user, wherein when the real-time call management function is not enabled for the user, a call screening function is performed if a calling party number associated with the calling party is determined to be invalid; receives input from the user indicative of selection of the call screening option; and sends information to a server reflective of the selection of the call screening option, wherein the server initiates the call screening function responsive to the selection of the call screening option;

a user interface that displays the notification; and a processor that runs the program.

47. A system for screening a call, comprising:

a voice network;

a data network;

a plurality of devices associated with a user; and a service center operable to:

receive information pertaining to a call to a user from a calling party;

determine whether a real-time call management function is enabled for the user;

determine whether a calling party number associated with the calling party is valid following a determination that the real-time call management function is not enabled, wherein a call screening function is performed when the calling party number is determined to be invalid;

provide a notification of the call to one of the plurality of devices associated with the user via the data network following a determination that the real-time call management function is enabled, the notification including a user-selectable call screening option;

and initiate the call screening function when the user selects the call screening option.

48. An apparatus for screening a call, comprising:

a first server operable to receive information pertaining to a call to a user from a calling party; determine whether a real-time call management function is enabled for the user; determine whether a calling party number associated with the calling party is valid following a determination that the real-time call management function is not enabled, wherein a call screening function is performed when the calling party number is determined to be invalid; and provide a notification of the call to a device associated with the user following a determination that the real-time call management function is enabled, the notification including a user-selectable call screening option; and a second server operable to initiate the call screening function when the user selects the call screening option.

49. An apparatus for screening a call, comprising:

a first server operable to receive information pertaining to a call to a user from a calling party; retrieve data corresponding to the user using the information pertaining to the call; determine whether a real-time call management function is enabled for the user; determine whether a calling party number associated with the calling party is valid following a determination that the real-time call management function is not enabled, wherein a call screening function is performed when the calling party number is determined to be invalid; select a device associated with the user to receive a notification of the call based on the retrieved data corresponding to the user; and provide the notification of the call to the selected device following a determination that the real-time call management function is enabled, the notification including a user-selectable call screening option; and a second server operable to initiate the call screening function when the user selects the call screening option.

* * * * *